US012328749B2

(12) United States Patent
Khoshnevisan et al.

(10) Patent No.: US 12,328,749 B2
(45) Date of Patent: Jun. 10, 2025

(54) BEAM SWITCHING TECHNIQUES FOR UPLINK TRANSMISSION

(71) Applicant: QUALCOMM INCORPORATED, San Diego, CA (US)

(72) Inventors: Mostafa Khoshnevisan, San Diego, CA (US); Fang Yuan, Beijing (CN); Xiaoxia Zhang, San Diego, CA (US); Wooseok Nam, San Diego, CA (US); Tao Luo, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 17/758,450

(22) PCT Filed: Feb. 25, 2020

(86) PCT No.: PCT/CN2020/076558
§ 371 (c)(1),
(2) Date: Jul. 6, 2022

(87) PCT Pub. No.: WO2021/168645
PCT Pub. Date: Sep. 2, 2021

(65) Prior Publication Data
US 2023/0033910 A1    Feb. 2, 2023

(51) Int. Cl.
*H04W 72/54* (2023.01)
*H04L 5/00* (2006.01)
(Continued)

(52) U.S. Cl.
CPC ........... *H04W 72/54* (2023.01); *H04L 5/0051* (2013.01); *H04W 72/1263* (2013.01); *H04W 72/23* (2023.01); *H04W 80/02* (2013.01)

(58) Field of Classification Search
CPC ............ H04L 25/0334; H04L 25/0226; H04L 5/0048; H04L 2025/03414; H04W 72/23; H04B 7/088; H04B 7/0695
See application file for complete search history.

(56) References Cited

U.S. PATENT DOCUMENTS

2016/0227548 A1* 8/2016 Nimbalker ........... H04B 7/0626
2019/0132109 A1* 5/2019 Zhou ..................... H04L 5/001
(Continued)

FOREIGN PATENT DOCUMENTS

CN    108288991 A    7/2018
CN    110022197 A    7/2019
(Continued)

OTHER PUBLICATIONS

International Search Report and Written Opinion—PCT/CN2020/076558—ISA/EPO—Nov. 16, 2020.
(Continued)

*Primary Examiner* — Mahran Y Abu Roumi
(74) *Attorney, Agent, or Firm* — Dalei Dong; Holland & Hart LLP

(57) ABSTRACT

Methods, systems, and devices for wireless communications are described. A user equipment (UE) may receive sounding reference signal (SRS) resource set configuration information that indicates an aperiodic SRS resource set, an aperiodic downlink reference signal resource associated with the aperiodic SRS resource set, and a slot offset associated with the aperiodic downlink reference signal resource. The UE may receive downlink control information indicating that the aperiodic SRS resource set is triggered and determine a quasi co-location assumption for the aperiodic downlink reference signal resource based on the slot offset associated with the aperiodic downlink reference signal resource. The UE may measure the aperiodic downlink reference signal (Continued)

resource in a slot indicated by the slot offset based on the quasi co-location assumption.

23 Claims, 18 Drawing Sheets

(51) Int. Cl.
*H04W 72/1263* (2023.01)
*H04W 72/23* (2023.01)
*H04W 80/02* (2009.01)

(56) References Cited

U.S. PATENT DOCUMENTS

| | | | |
|---|---|---|---|
| 2019/0174466 A1* | 6/2019 | Zhang | H04L 5/0057 |
| 2019/0296956 A1* | 9/2019 | John Wilson | H04W 48/08 |
| 2021/0014016 A1* | 1/2021 | Liu | H04W 52/42 |
| 2022/0210812 A1* | 6/2022 | Matsumura | H04W 72/23 |

FOREIGN PATENT DOCUMENTS

| | | |
|---|---|---|
| CN | 110474724 A | 11/2019 |
| CN | 110521137 A | 11/2019 |
| EP | 3567744 A1 | 11/2019 |
| WO | WO-2019032020 A1 | 2/2019 |
| WO | WO-2019097482 A1 | 5/2019 |
| WO | WO-2019147631 A1 | 8/2019 |
| WO | WO-2019213914 A1 | 11/2019 |
| WO | WO-2020030189 A1 | 2/2020 |

OTHER PUBLICATIONS

Ericsson: "Feature Lead Summary Beam Management", 3GPP TSG-RAN WG1 Meeting #94, Tdoc R1-1809759, Gothenburg, Aug. 20, 2018-Aug. 24, 2018, pp. 1-23, Aug. 24, 2018, pp. 3-8.
Qualcomm Incorporated: "Maintenance for Non-Codebook Based UL Transmission", 3GPP TSG RAN WG1 Meeting #92bis, R1-1804784, Sanya, China, Apr. 16, 2018-Apr. 20, 2018, Apr. 7, 2018, pp. 1-4.
Ericsson: "Feature Lead Summary Beam Management", 3GPP TSG-RAN WG1 Meeting #94, Tdoc R1-1809759, 3rd Generation Partnership Project, Mobile Competence Centre, 650, Route Des Lucioles, F-06921 Sophia-Antipolis Cedex, France, vol. RAN WG1, No. Gothenburg, Aug. 20, 2018-Aug. 24, 2018, Aug. 23, 2018, XP051517120, 23 Pages, sections 1-3, Chapters 3.1, 3.4, 3.4.1, 3.6, 3.7 and 3.8.
Qualcomm Incorporated: "Maintenance for Non-Codebook Based UL Transmission", 3GPP TSG RAN WG1 Meeting #92bis, R1-1804784, 3rd Generation Partnership Project, Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018, pp. 1-4, XP051427051, sections 1-6.
Supplementary European Search Report—EP20921911—Search Authority—The Hague—Oct. 12, 2023.
ZTE, et al., "TEI Proposal on Aperiodic RS Triggering Offset", 3GPP TSG RAN WG1 Meeting #98bis, R1-1911520, 3rd Generation Partnership Project, Mobile Competence Centre, 650, Route Des Lucioles, F-06921 Sophia-Antipolis Cedex, vol. RAN WG1, No. Chongqing, China, Oct. 14, 2019-Oct. 20, 2019, Oct. 22, 2019, pp. 1-8, XP051798784, slides 2-7.

\* cited by examiner

BEAM SWITCHING TECHNIQUES FOR UPLINK TRANSMISSION

CROSS REFERENCE

The present Application is a 371 national stage filing of International PCT Application No. PCT/CN2020/076558 by KHOSHNEVISAN et al. entitled "BEAM SWITCHING TECHNIQUES FOR UPLINK TRANSMISSION," filed Feb. 25, 2020, assigned to the assignee hereof, and expressly incorporated by reference herein.

FIELD OF TECHNOLOGY

The following relates generally to wireless communications and more specifically to beam switching techniques for uplink transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless systems, a device may use beamformed communications. For example, a UE may select beams to monitor downlink resources and to transmit on uplink resources. Some techniques for applying a beamforming configuration can be improved.

SUMMARY

The described techniques relate to improved methods, systems, devices, and apparatuses that support beam switching techniques for uplink transmission. Generally, the described techniques provide for determining a quasi co-location (QCL) of a downlink reference signal resource that is used to determine an uplink precoder for non-codebook-based uplink transmission. For non-codebook-based uplink transmission, a user equipment (UE) may determine an uplink precoder for transmitting on a set of sounding reference signal (SRS) resources based on a measurement of a downlink reference signal resource, such as a channel state information reference signal (CSI-RS) resource. A base station may configure the set of SRS resources and indicate the associated downlink reference signal resource. In some cases, the SRS resource set and the downlink reference signal resource may be aperiodic and triggered by downlink control information (DCI). When the UE receives the triggering DCI, the UE may measure the downlink reference signal resource, determine a transmit precoder based on the measurement, and transmit SRS on indicated SRS resources using the precoder.

According to techniques described herein, a base station may configure the UE with a downlink reference signal resource slot offset. The downlink reference signal resource may be included in a slot as indicated by the downlink reference signal resource slot offset. The slot offset for the downlink reference resource may provide sufficient time for the UE to determine a QCL assumption for the downlink reference signal resource and switch beams to measure the downlink reference signal resource. In some cases, the QCL assumption may be based on a beam switching capability of the UE. For example, if the UE has sufficient time to determine the QCL assumption and switch beams, the UE may apply a transmit configuration indicator (TCI) state associated with the aperiodic downlink reference signal resource. Otherwise, the UE may use a QCL assumption shared by another signal or a default QCL assumption. Techniques herein also describe using a Medium Access Control (MAC) control element (CE) for more dynamic configuration and reconfiguration of downlink reference signal resources which are associated with an SRS resource set. For example, the association between a downlink reference signal resource and an SRS resource set may be configured by RRC signaling. By using a MAC CE to update an association between an SRS resource set and a downlink reference signal resource, a UE may have increased flexibility for adjusting uplink beams. In some cases, a MAC CE may be used to indicate a TCI state for a downlink reference signal resource, which may also be used to adjust the uplink beam for the UE without configuring a new downlink reference signal resource.

A method of wireless communications at a UE is described. The method may include receiving sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource, receiving downlink control information in a first slot, the downlink control information indicating that the aperiodic sounding reference signal resource set is triggered, determining a quasi co-location assumption for the aperiodic downlink reference signal resource based on the slot offset associated with the aperiodic downlink reference signal resource, and measuring the aperiodic downlink reference signal resource in a second slot indicated by the slot offset based on the quasi co-location assumption.

An apparatus for wireless communications at a UE is described. The apparatus may include a processor, memory coupled with the processor, and instructions stored in the memory. The instructions may be executable by the processor to cause the apparatus to receive sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource, receive downlink control information in a first slot, the downlink control information indicating that the aperiodic sounding reference signal resource set is triggered, determine a quasi co-location assumption for the aperiodic downlink reference signal resource based on the slot offset associated with the aperiodic downlink reference signal resource, and measure the aperiodic downlink reference signal resource in a second slot indicated by the slot offset based on the quasi co-location assumption.

Another apparatus for wireless communications at a UE is described. The apparatus may include means for receiving sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource, receiving downlink control information in a first slot, the downlink control information indicating that the aperiodic sounding reference signal resource set is triggered, determining a quasi co-location assumption for the aperiodic downlink reference signal resource based on the slot offset associated with the aperiodic downlink reference signal resource, and measuring the aperiodic downlink reference signal resource in a second slot indicated by the slot offset based on the quasi co-location assumption.

A non-transitory computer-readable medium storing code for wireless communications at a UE is described. The code may include instructions executable by a processor to receive sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource, receive downlink control information in a first slot, the downlink control information indicating that the aperiodic sounding reference signal resource set is triggered, determine a quasi co-location assumption for the aperiodic downlink reference signal resource based on the slot offset associated with the aperiodic downlink reference signal resource, and measure the aperiodic downlink reference signal resource in a second slot indicated by the slot offset based on the quasi co-location assumption.

In some examples of the method, apparatuses, and non-transitory computer-readable medium described herein, determining the quasi co-location assumption further may include operations, features, means, or instructions for determining a beam switching capability of the UE may be greater than a scheduling offset between the downlink control information and the aperiodic downlink reference signal resource, and identifying a TCI state of the aperiodic downlink reference signal resource, where the quasi co-location assumption may be associated with the TCI state of the aperiodic downlink reference signal resource based on the beam switching capability being greater than the scheduling offset.

In some examples of the method, apparatuses, and non-transitory computer-readable medium described herein, determining the quasi co-location assumption further may include operations, features, means, or instructions for determining a beam switching capability of the UE may be smaller than a scheduling offset between the downlink control information and the aperiodic downlink reference signal resource, and detecting a downlink signal scheduled to overlap with the aperiodic downlink reference signal resource, where the quasi co-location assumption may be associated with the downlink signal based on the beam switching capability being smaller than the scheduling offset.

In some examples of the method, apparatuses, and non-transitory computer-readable medium described herein, determining the quasi co-location assumption further may include operations, features, means, or instructions for determining a beam switching capability of the UE may be smaller than a scheduling offset between the downlink control information and the aperiodic downlink reference signal resource, and identifying a default quasi co-location assumption, where the quasi co-location assumption may be the default quasi co-location assumption based on the beam switching capability being smaller than the scheduling offset.

In some examples of the method, apparatuses, and non-transitory computer-readable medium described herein, the default quasi co-location assumption may be associated with a control resource set with a lowest control resource identifier among control resource sets monitored in a latest slot.

Some examples of the method, apparatuses, and non-transitory computer-readable medium described herein may further include operations, features, means, or instructions for receiving a configuration for the aperiodic downlink reference signal resource including a TCI state associated with the aperiodic downlink reference signal resource.

Some examples of the method, apparatuses, and non-transitory computer-readable medium described herein may further include operations, features, means, or instructions for determining a scheduling offset for the aperiodic downlink reference signal resource based on the slot offset, where the scheduling offset corresponds to a number of symbol periods between a last symbol period of the downlink control information and a first symbol period of the aperiodic downlink reference signal resource.

Some examples of the method, apparatuses, and non-transitory computer-readable medium described herein may further include operations, features, means, or instructions for identifying a set of configured TCI states, determining that all configured TCI states of the set of configured TCI states may be not associated with a spatial quasi co-location assumption, and determining the slot offset to be zero, where the aperiodic downlink reference signal resource may be in the first slot with the downlink control information.

In some examples of the method, apparatuses, and non-transitory computer-readable medium described herein, the downlink control information includes group common downlink control information, uplink-based downlink control information, downlink-based downlink control information, or a combination thereof.

In some examples of the method, apparatuses, and non-transitory computer-readable medium described herein, the aperiodic downlink reference signal resource may be triggered based on a sounding reference signal request field in the downlink control information.

In some examples of the method, apparatuses, and non-transitory computer-readable medium described herein, the aperiodic sounding reference signal resource set configuration information may be received in a radio resource control configuration.

In some examples of the method, apparatuses, and non-transitory computer-readable medium described herein, the aperiodic downlink reference signal resource includes an aperiodic channel state information reference signal resource.

A method of wireless communication at a base station is described. The method may include transmitting, to a UE, sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource, transmitting downlink control information in a first slot, the downlink control information indicating that the aperiodic sounding reference signal resource set is triggered, determining a quasi co-location assumption for the aperiodic downlink reference signal resource based on the slot offset associated with the aperiodic downlink reference signal resource, and transmitting the aperiodic downlink reference signal resource in a second slot indicated by the first slot based on the quasi co-location assumption.

An apparatus for wireless communication at a base station is described. The apparatus may include a processor, memory coupled with the processor, and instructions stored in the memory. The instructions may be executable by the processor to cause the apparatus to transmit, to a UE, sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource, transmit downlink control information in a first slot, the downlink control information indicating that the aperiodic sounding reference signal resource set is triggered, determine a quasi co-location assumption for the aperiodic downlink reference signal resource based on the slot offset associated with the aperiodic downlink reference signal resource, and transmit the aperiodic downlink reference signal resource in a second slot indicated by the first slot based on the quasi co-location assumption.

Another apparatus for wireless communication at a base station is described. The apparatus may include means for transmitting, to a UE, sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource, transmitting downlink control information in a first slot, the downlink control information indicating that the aperiodic sounding reference signal resource set is triggered, determining a quasi co-location assumption for the aperiodic downlink reference signal resource based on the slot offset associated with the aperiodic downlink reference signal resource, and transmitting the aperiodic downlink reference signal resource in a second slot indicated by the first slot based on the quasi co-location assumption.

A non-transitory computer-readable medium storing code for wireless communication at a base station is described. The code may include instructions executable by a processor to transmit, to a UE, sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource, transmit downlink control information in a first slot, the downlink control information indicating that the aperiodic sounding reference signal resource set is triggered, determine a quasi co-location assumption for the aperiodic downlink reference signal resource based on the slot offset associated with the aperiodic downlink reference signal resource, and transmit the aperiodic downlink reference signal resource in a second slot indicated by the first slot based on the quasi co-location assumption.

In some examples of the method, apparatuses, and non-transitory computer-readable medium described herein, determining the quasi co-location assumption further may include operations, features, means, or instructions for determining a beam switching capability of the UE may be greater than a scheduling offset between the downlink control information and the aperiodic downlink reference signal resource, and identifying a TCI state of the aperiodic downlink reference signal resource, where the quasi co-location assumption may be associated with the TCI state of the aperiodic downlink reference signal resource based on the beam switching capability of the UE being greater than the scheduling offset.

In some examples of the method, apparatuses, and non-transitory computer-readable medium described herein, determining the quasi co-location assumption further may include operations, features, means, or instructions for determining a beam switching capability of the UE may be smaller than a scheduling offset between the downlink control information and the aperiodic downlink reference signal resource, and identifying a downlink signal scheduled to overlap with the aperiodic downlink reference signal resource, where the quasi co-location assumption may be associated with the downlink signal based on the beam switching capability of the UE being smaller than the scheduling offset.

In some examples of the method, apparatuses, and non-transitory computer-readable medium described herein, determining the quasi co-location assumption further may include operations, features, means, or instructions for determining a beam switching capability of the UE may be smaller than a scheduling offset between the downlink control information and the aperiodic downlink reference signal resource, and identifying a default quasi co-location assumption, where the quasi co-location assumption may be the default quasi co-location assumption based on the beam switching capability of the UE being smaller than the scheduling offset.

Some examples of the method, apparatuses, and non-transitory computer-readable medium described herein may further include operations, features, means, or instructions for transmitting a configuration for the aperiodic downlink reference signal resource including a TCI state associated with the aperiodic downlink reference signal resource.

Some examples of the method, apparatuses, and non-transitory computer-readable medium described herein may further include operations, features, means, or instructions for determining a scheduling offset for the aperiodic downlink reference signal resource based on the slot offset, where the scheduling offset corresponds to a number of symbol periods between a last symbol period of the downlink control information and a first symbol period of the aperiodic downlink reference signal resource.

In some examples of the method, apparatuses, and non-transitory computer-readable medium described herein, the downlink control information includes group common downlink control information, uplink-based downlink control information, downlink-based downlink control information, or a combination thereof.

Some examples of the method, apparatuses, and non-transitory computer-readable medium described herein may further include operations, features, means, or instructions for triggering the aperiodic downlink reference signal resource based on a sounding reference signal request field in the downlink control information.

In some examples of the method, apparatuses, and non-transitory computer-readable medium described herein, the aperiodic sounding reference signal resource set configuration information may be transmitted in a radio resource control configuration.

In some examples of the method, apparatuses, and non-transitory computer-readable medium described herein, the aperiodic downlink reference signal resource includes a channel state information reference signal resource.

A method of wireless communications at a UE is described. The method may include receiving a MAC CE indicating a downlink reference signal resource associated with a sounding reference signal resource set, determining a quasi co-location assumption for the downlink reference signal resource, and measuring the downlink reference signal resource based on the quasi co-location assumption.

An apparatus for wireless communications at a UE is described. The apparatus may include a processor, memory coupled with the processor, and instructions stored in the memory. The instructions may be executable by the processor to cause the apparatus to receive a MAC CE indicating a downlink reference signal resource associated with a sounding reference signal resource set, determine a quasi co-location assumption for the downlink reference signal resource, and measure the downlink reference signal resource based on the quasi co-location assumption.

Another apparatus for wireless communications at a UE is described. The apparatus may include means for receiving a MAC CE indicating a downlink reference signal resource associated with a sounding reference signal resource set, determining a quasi co-location assumption for the downlink reference signal resource, and measuring the downlink reference signal resource based on the quasi co-location assumption.

A non-transitory computer-readable medium storing code for wireless communications at a UE is described. The code may include instructions executable by a processor to receive a MAC CE indicating a downlink reference signal resource associated with a sounding reference signal resource set, determine a quasi co-location assumption for the downlink reference signal resource, and measure the downlink reference signal resource based on the quasi co-location assumption.

In some examples of the method, apparatuses, and non-transitory computer-readable medium described herein, the MAC CE includes a non-zero power (NZP) CSI-RS identifier for the downlink reference signal resource, a sounding reference signal resource set identifier for the sounding reference signal resource set, a serving cell index, a bandwidth part identifier, or a combination thereof.

In some examples of the method, apparatuses, and non-transitory computer-readable medium described herein, the MAC CE includes an indicator for an aperiodic resource trigger for the sounding reference signal resource set, an aperiodic resource trigger list for the sounding reference signal resource set, a slot offset value for the sounding reference signal resource set, a slot offset for the downlink reference signal resource, or a combination thereof.

Some examples of the method, apparatuses, and non-transitory computer-readable medium described herein may further include operations, features, means, or instructions for applying a command associated with the MAC CE after transmitting feedback for a downlink shared channel message including the MAC CE.

Some examples of the method, apparatuses, and non-transitory computer-readable medium described herein may further include operations, features, means, or instructions for receiving, by the MAC CE, a TCI state for the downlink reference signal resource, where the quasi co-location assumption may be based on the TCI state for the downlink reference signal resource.

In some examples of the method, apparatuses, and non-transitory computer-readable medium described herein, the MAC CE includes an indicator for an aperiodic resource trigger for the sounding reference signal resource set, an aperiodic resource trigger list for the sounding reference signal resource set, a slot offset value for the sounding reference signal resource set, a slot offset for the downlink reference signal resource, or a combination thereof.

In some examples of the method, apparatuses, and non-transitory computer-readable medium described herein, the sounding reference signal resource set may be an aperiodic resource set, a periodic resource set, or a semi-persistent resource set.

A method of wireless communications at a base station is described. The method may include transmitting a MAC CE indicating a downlink reference signal resource associated with a sounding reference signal resource set, determining a quasi co-location assumption for the downlink reference signal resource, and transmitting the downlink reference signal resource based on the quasi co-location assumption.

An apparatus for wireless communications at a base station is described. The apparatus may include a processor, memory coupled with the processor, and instructions stored in the memory. The instructions may be executable by the processor to cause the apparatus to transmit a MAC CE indicating a downlink reference signal resource associated with a sounding reference signal resource set, determine a quasi co-location assumption for the downlink reference signal resource, and transmit the downlink reference signal resource based on the quasi co-location assumption.

Another apparatus for wireless communications at a base station is described. The apparatus may include means for transmitting a MAC CE indicating a downlink reference signal resource associated with a sounding reference signal resource set, determining a quasi co-location assumption for the downlink reference signal resource, and transmitting the downlink reference signal resource based on the quasi co-location assumption.

A non-transitory computer-readable medium storing code for wireless communications at a base station is described. The code may include instructions executable by a processor to transmit a MAC CE indicating a downlink reference signal resource associated with a sounding reference signal resource set, determine a quasi co-location assumption for the downlink reference signal resource, and transmit the downlink reference signal resource based on the quasi co-location assumption.

In some examples of the method, apparatuses, and non-transitory computer-readable medium described herein, the MAC CE includes a NZP CSI-RS identifier for the downlink reference signal resource, a sounding reference signal resource set identifier for the sounding reference signal resource set, a serving cell index, a bandwidth part identifier, or a combination thereof.

In some examples of the method, apparatuses, and non-transitory computer-readable medium described herein, the MAC CE includes an indicator for an aperiodic resource trigger for the sounding reference signal resource set, an aperiodic resource trigger list for the sounding reference signal resource set, a slot offset value for the sounding reference signal resource set, a slot offset for the downlink reference signal resource, or a combination thereof.

Some examples of the method, apparatuses, and non-transitory computer-readable medium described herein may further include operations, features, means, or instructions for indicating, by the MAC CE, a TCI state for the downlink reference signal resource, where the quasi co-location assumption may be based on the TCI state for the downlink reference signal resource.

In some examples of the method, apparatuses, and non-transitory computer-readable medium described herein, the sounding reference signal resource set may be an aperiodic resource set, a periodic resource set, or a semi-persistent resource set.

DETAILED DESCRIPTION

Figure 1:
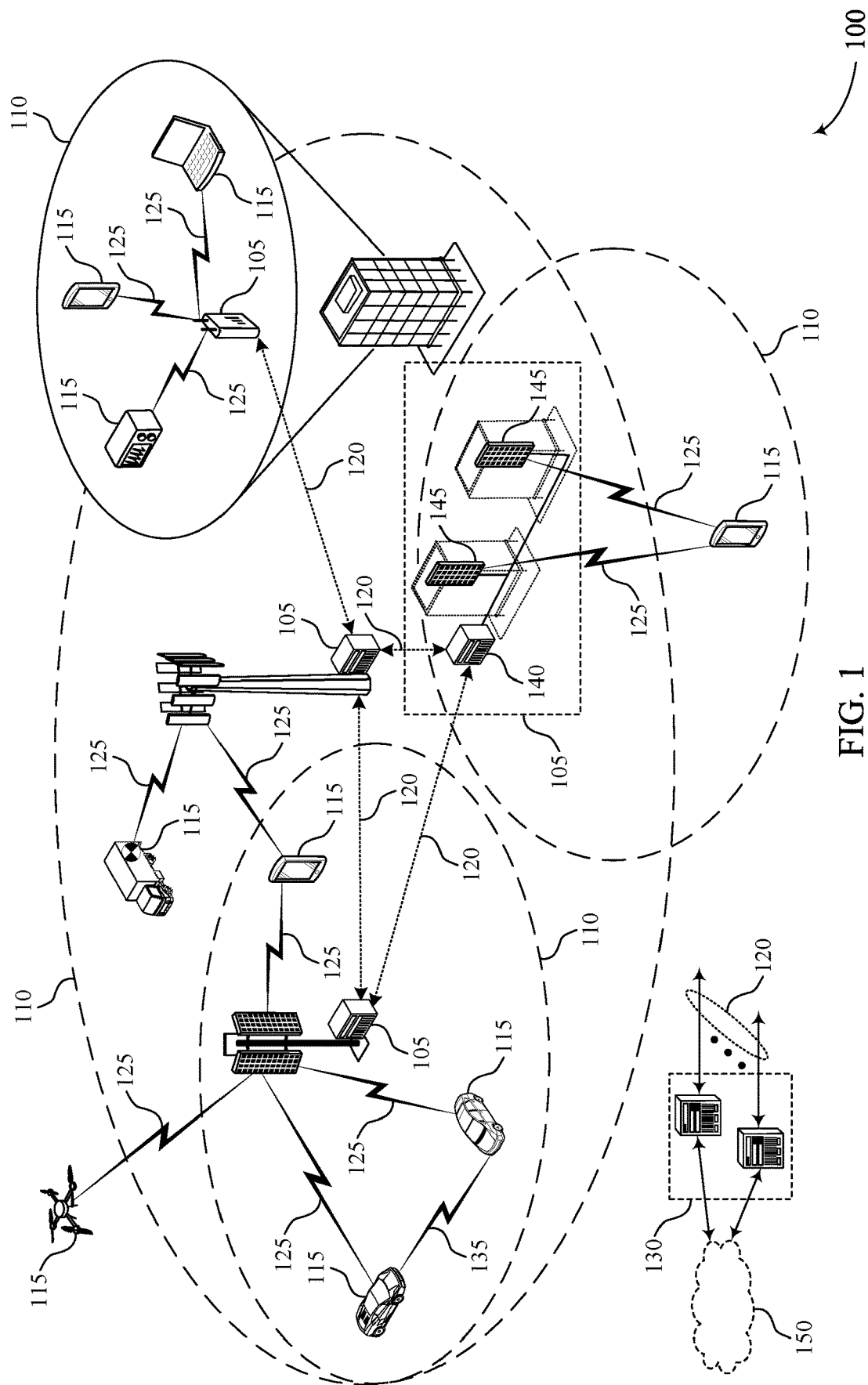
FIG. 1 illustrates an example of a system for wireless communications that supports beam switching techniques for uplink transmission in accordance with aspects of the present disclosure.

A user equipment (UE) may be configured for non-codebook-based uplink transmission. For non-codebook-based uplink transmission, the UE may determine an uplink precoder for transmitting on a set of sounding reference signal (SRS) resources based on a measurement of a downlink reference signal resource, such as a channel state information reference signal (CSI-RS) resource. A base station may configure the set of SRS resources and indicate the associated downlink reference signal resource. In some cases, the SRS resource set and the downlink reference signal resource may be aperiodic and triggered by downlink control information (DCI). When the UE receives the triggering DCI, the UE may measure the downlink reference signal resource, calculate a precoder based on the downlink reference signal resource, and transmit SRS on SRS resources indicated by the DCI. The base station receives the precoded SRS resources and indicates one or more of the SRS resources to the UE with an uplink grant. The UE then configures an uplink transmission on the granted resource based on the beam and precoding of the indicated SRS resources. In some systems, the aperiodic downlink reference signal resource may be in the same slot as the DCI. However, in some cases, a UE may use a spatial quasi co-location (QCL) assumption for communications. If the aperiodic downlink reference signal resource is in the same slot as the DCI, the UE may not have sufficient time to switch beams to receive the aperiodic downlink reference signal resource.

Wireless communications systems described herein support techniques for enhanced uplink beam switching. For example, these techniques may be implemented by a UE to determine, and apply, a QCL assumption to measure an aperiodic downlink reference signal resource and determine an uplink precoder for an associated aperiodic SRS resource set. As part of configuring the SRS resource set, the base station may also configure a downlink reference signal resource slot offset. The downlink reference signal resource may be included in a slot as indicated by the downlink reference signal resource slot offset. This may provide sufficient time for the UE to determine a QCL assumption for the downlink reference signal resource and switch beams to measure the downlink reference signal resource. In some cases, the QCL assumption may be based on a beam switching capability of the UE. For example, if the UE has sufficient time to determine the QCL assumption and switch beams, the UE may apply a transmit configuration indicator (TCI) state associated with the aperiodic downlink reference signal resource. Otherwise, the UE may use a QCL assumption shared by another signal or a default QCL assumption.

Techniques herein also describe using a Medium Access Control (MAC) control element (CE) for more dynamic configuration and reconfiguration of downlink reference signal resources which are associated with an SRS resource set. For example, the association between a downlink reference signal resource and an SRS resource set may be configured by RRC signaling. By using a MAC CE to update an association between an SRS resource set and a downlink reference signal resource, a UE may have increased flexibility for adjusting uplink beams. In some cases, a MAC CE may be used to indicate a TCI state for a downlink reference signal resource, which may also be used to adjust the uplink beam for the UE without configuring a new downlink reference signal resource.

Aspects of the disclosure are initially described in the context of wireless communications systems. Aspects of the disclosure are further illustrated by and described with reference to apparatus diagrams, system diagrams, and flowcharts that relate to beam switching techniques for uplink transmission.

FIG. 1 illustrates an example of a wireless communications system 100 that supports beam switching techniques for uplink transmission in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS, which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may be configured for non-codebook-based uplink transmission. For non-codebook-based uplink transmission, the UE 115 may determine an uplink precoder for transmitting on a set of SRS resources based on a measurement of a downlink reference signal resource, such as CSI-RS. The UE 115 may measure the downlink reference signal resource and calculate the uplink precoder based on the measurement. The base station 105 may configure the set of SRS resources and the associated downlink reference signal resource. In some cases, the set of SRS resources may include up to four SRS resources. The configuration may indicate that set of SRS resources are configured non-codebook usage. Other uses for an aperiodic SRS resource set may include codebook usage, beam management usage, and antenna switching. In some cases, the SRS resource set may be configured by RRC.

In some cases, the SRS resource set and the downlink reference signal resource may be aperiodic. The base station 105 may transmit DCI to trigger the downlink reference signal resource and one or more sets of SRS resources. In some cases, aperiodic SRS may be triggered with certain formats of DCI, such as downlink DCI with format 1_1 or 1_2, uplink DCI with format 0_1 or 0_2, or group-common DCI with format 2_3. For example, an SRS request field in the DCI may indicate one or more sets of SRS resources. The UE 115 may measure the downlink reference signal resource, calculate a precoder based on the downlink reference signal resource, and transmit SRS on the SRS resources indicated by the SRS request field. The DCI may schedule an uplink shared channel transmission, and UE 115 may use the same uplink precoder and spatial domain filter (e.g., beam) as used for the indicated SRS resources.

The base station 105 receives the precoded SRS resources and selects one or more of the SRS resources to indicate in an uplink DCI for uplink shared channel (e.g., physical uplink shared channel (PUSCH)) scheduling. The base station 105 may transmit the uplink DCI with an SRS resource indicator, which indicates one or more of the SRS resources transmitted on by the UE 115. The UE 115 may transmit on the uplink shared channel with the same precoders and spatial domain filter as the indicated SRS resources. The number of SRS resources indicated by the SRS resource indicator may determine the rank (e.g., a number of layers) of the uplink transmission. In some cases, there may be a mapping between SRS resource sets and the SRS request field codepoints, which may be indicated by fields such as an aperiodicSRS-ResourceTrigger or aperiodicSRS-ResourceTriggerList.

A set of aperiodic SRS resources may be configured with a slot offset. The SRS slot offset may be included as part of configuring the aperiodic SRS resources may be configured with the aperiodic SRS resources. The aperiodic SRS resource slot offset may indicate that the SRS resources in the SRS resource set are transmitted that many slots after the slot in which the triggering DCI is received. For example, if the aperiodic SRS slot offset is 4, then the SRS resources of the aperiodic SRS resource set are transmitted 4 slots after the slot carrying the triggering DCI.

A base station 105 may also configure a UE 115 with a downlink reference signal resource slot offset. The downlink reference signal resource may be included in a slot as indicated by the downlink reference signal resource slot offset. The slot offset for the downlink reference resource may provide sufficient time for the UE 115 to determine a QCL assumption for the downlink reference signal resource and switch beams to measure the downlink reference signal resource. In some cases, the QCL assumption may be based on a beam switching capability of the UE 115. For example, if the UE 115 has sufficient time to determine the QCL assumption and switch beams, the UE 115 may apply a TCI state associated with the aperiodic downlink reference signal resource. Otherwise, the UE 115 may use a QCL assumption shared by another signal or a default QCL assumption.

Figure 2:
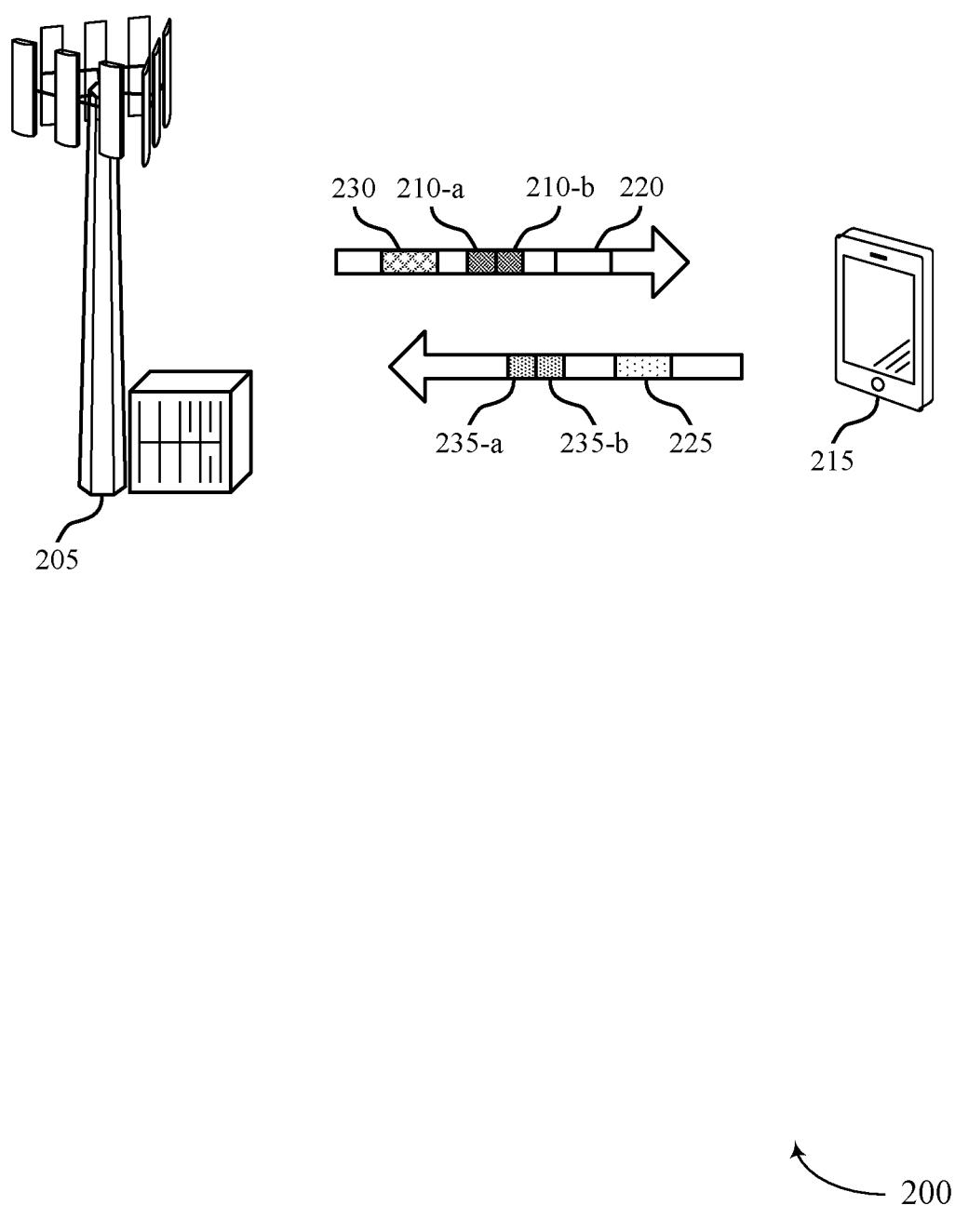
FIG. 2 illustrates an example of a wireless communications system that supports beam switching techniques for uplink transmission in accordance with aspects of the present disclosure.

Techniques herein also describe using a MAC CE for more dynamic configuration and reconfiguration of downlink reference signal resources which are associated with an SRS resource set. For example, the association between a downlink reference signal resource and an SRS resource set may be configured by RRC signaling. By using a MAC CE to update an association between an SRS resource set and a downlink reference signal resource, a UE 115 may have increased flexibility for adjusting uplink beams. In some cases, a MAC CE may be used to indicate a TCI state for a downlink reference signal resource, which may also be used to adjust the uplink beam for the UE 115 without configuring a new downlink reference signal resource FIG. 2 illustrates an example of a wireless communications system 200 that supports beam switching techniques for uplink transmission in accordance with aspects of the present disclosure. In some examples, the wireless communications system 200 may implement aspects of wireless communication system 100. For example, wireless communications system 200 may include base station 205 and UE 215, which may be respective examples of a base station 105 and a UE 115 described with reference to FIG. 1. As described herein, base station 205 may configure UE 215 with SRS resources, UE 215 may transmit SRS using the configured SRS resources, and base station 205 may indicate one or more of the SRS resources for UE 215 to select a transmit configuration for an associated uplink transmission.

In some examples, UE 215 may be configured for non-codebook-based uplink transmission. For non-codebook-based uplink transmission, UE 215 may determine an uplink precoder for transmitting on a set of SRS resources 235 based on a measurement of a downlink reference signal resource 210, such as CSI-RS. UE 215 may measure the downlink reference signal resource 210 and calculate the uplink precoder based on the measurement. An uplink precoder for codebook-based uplink transmissions, for comparison, may be selected based on an indication (e.g., from a base station 105) to an index in a codebook or a value in a precoder matrix configured at a UE 115. In some cases, for non-codebook-based uplink transmission, the base station 105 may not have configured the UE 115 with a transmit precoder matrix or sent a transmit precoder matrix indicator.

Base station 205 may transmit configuration information 230 to configure the set of SRS resources 235 and the downlink reference signal resource 210. In some cases, the set of SRS resources 235 may include up to four SRS resources. The configuration information 230 may indicate that set of SRS resources 235 are configured non-codebook usage (e.g., based on a configuration of a "usage" parameter in the configuration information 230). In some cases, a UE 115 may be configured with just one set of SRS resources 235 for non-codebook communications. In some cases, the configuration information 230 may be transmitted by RRC signaling.

The configuration information 230 may include an indicator of the downlink reference signal resource 210. In some cases, the configuration information 230 may include a configuration associating the set of SRS resources 235 with the downlink reference signal resource 210. In some cases, the downlink reference signal resource 210 may be a non-zero power CSI-RS resource.

In some cases, the set of SRS resources 235 and the downlink reference signal resource 210 may be aperiodic. Base station 205 may transmit DCI 220 to UE 215 to trigger the downlink reference signal resource 210 and one or more sets of SRS resources 235. For example, an SRS request field in the DCI 220 may indicate the one or more sets of SRS resources, including the set of SRS resources 235 with a usage set to non-codebook. UE 215 may measure the downlink reference signal resource 210, calculate a precoder based on the downlink reference signal resource 210, and transmit SRS on the SRS resources.

A set of aperiodic SRS resources may be configured with a slot offset. The SRS slot offset may be included as part of configuring the aperiodic SRS resource sets. The aperiodic SRS slot offset may indicate that the SRS resources in the SRS resource set are transmitted that many slots after the slot in which the DCI 220 is received. For example, if the aperiodic SRS slot offset is 4, then the SRS resources of the aperiodic SRS resource set are transmitted 4 slots after the slot carrying the DCI 220.

In some systems, the aperiodic downlink reference signal resource 210 may be in the same slot as the DCI 220. However, in some cases, a UE 115 may use a spatial quasi co-location (QCL) assumption for communications. If the aperiodic downlink reference signal resource 210 is in the same slot as the DCI 220 (e.g., scheduling the communication), then transmit configuration indicator (TCI) states for the UE 115 may not be configured with the spatial QCL assumption. Therefore, if the aperiodic downlink reference signal resource 210 is in the same slot as the DCI 220, the UE 115 may not have sufficient time to switch beams for reception of the aperiodic downlink reference signal resource 210. For example, UEs 115 operating in Frequency Range 2 (FR2) may use QCL Type D assumptions for communications. As such, UEs 115 operating in FR2 in some systems may not be able to support aperiodic non-codebook-based uplink transmissions, as the UEs 115 in these systems may not be able to switch beams and apply a spatial QCL assumption to receive the downlink reference signal resource.

The wireless communications system 200 supports techniques for enhanced uplink beam switching. For example, these techniques may be implemented by a UE 115 to determine, and apply, a QCL assumption to measure an aperiodic CSI-RS resource and determine an uplink precoder for an associated aperiodic set of SRS resources.

As part of the RRC configuration of the set of SRS resources 235, base station 205 may also configure a CSI-RS slot offset that is applied to the associated downlink reference signal resource. The CSI-RS slot offset may be indicated by a parameter, such as "SlotOffset-CSI-RS" in the configuration information 230. The slot offset for the CSI-RS resource may be different from the slot offset for the set of SRS resources 235. In some cases, there may be at least a 42 symbol gap between the associated CSI-RS and the set of SRS resources 235. In some cases, the CSI-RS slot offset may be smaller than the SRS resource set slot offset.

For example, UE 215 may be configured with the downlink reference signal resource 210 and the set of SRS resources 235, which may be aperiodic. The configuration information 230 configuring the resources may include a slot offset associated with the downlink reference signal resource 210. The downlink reference signal resource 210 may be included in a slot as indicated by the downlink reference signal resource slot offset. This may provide sufficient time for UE 215 to determine a QCL assumption for the downlink reference signal resource 210 and switch beams to measure the downlink reference signal resource 210.

Base station 205 may transmit the DCI 220 to UE 215 with an SRS request field that indicates the set of SRS resources 235 with the downlink reference signal resource 210 as the associated CSI-RS resource. UE 215 may be configured with a slot offset for the downlink reference signal resource 210. UE 215 may then determine which slot includes the downlink reference signal resource 210 based on the slot offset for the downlink reference signal resource 210. If, for example, the CSI-RS slot offset is "1," then the downlink reference signal resource 210 may be in the next slot after the DCI 220.

UE 215 may determine a QCL assumption for the downlink reference signal resource 210 and monitor for downlink reference signals on the downlink reference signal resource 210. For example, the downlink reference signal resource 210 may be associated with a TCI state. UE 215 may apply a QCL assumption (e.g., a spatial QCL assumption or Type D QCL assumption) associated with the TCI state to monitor for the downlink reference signal resource 210. In some cases, the downlink reference signal resource 210 may have an associated beam configuration or spatial QCL assumption configuration.

In some cases, the QCL assumption used by UE 215 to monitor the downlink reference signal resource 210 may be based on a beam switching capability of UE 215. For example, if a scheduling offset between the DCI 220 and the downlink reference signal resource 210 is larger than, or equal to, the beam switching capability of UE 215, UE 215 may apply the TCI state of the associated CSI-RS resource. However, if the scheduling offset is smaller than the beam switching capability of UE 215, UE 215 may not have enough time to determine and apply the TCI state before the downlink reference signal resource 210 begins. In some cases, a TCI state for an aperiodic CSI-RS resource may be configured as part of CSI-RS resource configuration.

UE 215 may apply techniques to determine a QCL assumption for receiving the downlink reference signal resource 210 if the scheduling offset is greater than a number of slots corresponding to the beam switching capability. For example, if there is another downlink signal in the same symbol as the associated CSI-RS, UE 215 may apply the QCL assumption of the other downlink signal for reception of the CSI-RS resource. In some cases, UE 215 may use a default QCL assumption. The default QCL assumption may be the QCL assumption of the lowest control resource set identifier in a latest slot that one or more control resource sets are monitored by UE 215.

In some cases, UE 215 may monitor the downlink reference signal resource 210 irrespective of QCL type of the configured TCI states for the serving cell index. In some cases, the CSI-RS slot offset value may be ignored (e.g., UE 215 assumes a CSI-RS slot offset of "0") if no configured TCI state has QCL Type D. For example, if UE 215 is not operating in FR2, UE 215 may assume that the CSI-RS slot offset is 0.

Additional techniques for associating a CSI-RS resource to an SRS resource set are described herein. For example, a CSI-RS associated with an SRS resource set used for non-codebook communications may be configured via RRC. A UE 115 then transmits the target SRS resources in the resource set, as well as a schedule uplink shared channel, with the same spatial domain transmission filter (e.g., uplink beam) used for the reception of the associated CSI-RS resource. The uplink beam may not be changed unless the associated CSI-RS for the SRS resource set changes. However, as described, some systems only support changing the CSI-RS resource via RRC configuration and reconfiguration, which can be slow and lead to inefficiencies.

The wireless communications system 200 may provide techniques for a base station to transmit a MAC CE which indicates a CSI-RS resource for an SRS resource set. The MAC CE may enable more dynamic configuration and reconfiguration of downlink reference signal resources which are associated with an SRS resource set. Indicating the CSI-RS resource via MAC CE may be used for periodic SRS resource sets, semi-persistent SRS resource sets, or aperiodic SRS resource sets. The command may be applied shortly after transmitting feedback corresponding to a downlink shared channel message including the MAC CE (e.g., 3 ms after transmitting the feedback).

The MAC CE may indicate a CSI-RS resource identifier. In some cases, the MAC CE may indicate an SRS resource set ID (e.g., if more than one SRS resource set for non-codebook usage is supported), a serving cell index, a bandwidth part identifier, or a combination thereof. In some cases, the MAC CE may indicate properties for the SRS resource set. For example, the MAC CE may indicate an aperiodic SRS resource trigger or an aperiodic SRS resource trigger list, a slot offset value for the SRS transmission, or a slot offset value for the CSI-RS. Additionally, or alternatively, the MAC CE may indicate a TCI state identifier for a CSI-RS. For example, instead of indicating a different, or additional, CSI-RS resource, the MAC CE may update or indicate the TCI state of an already configured CSI-RS resource.

Figure 3:
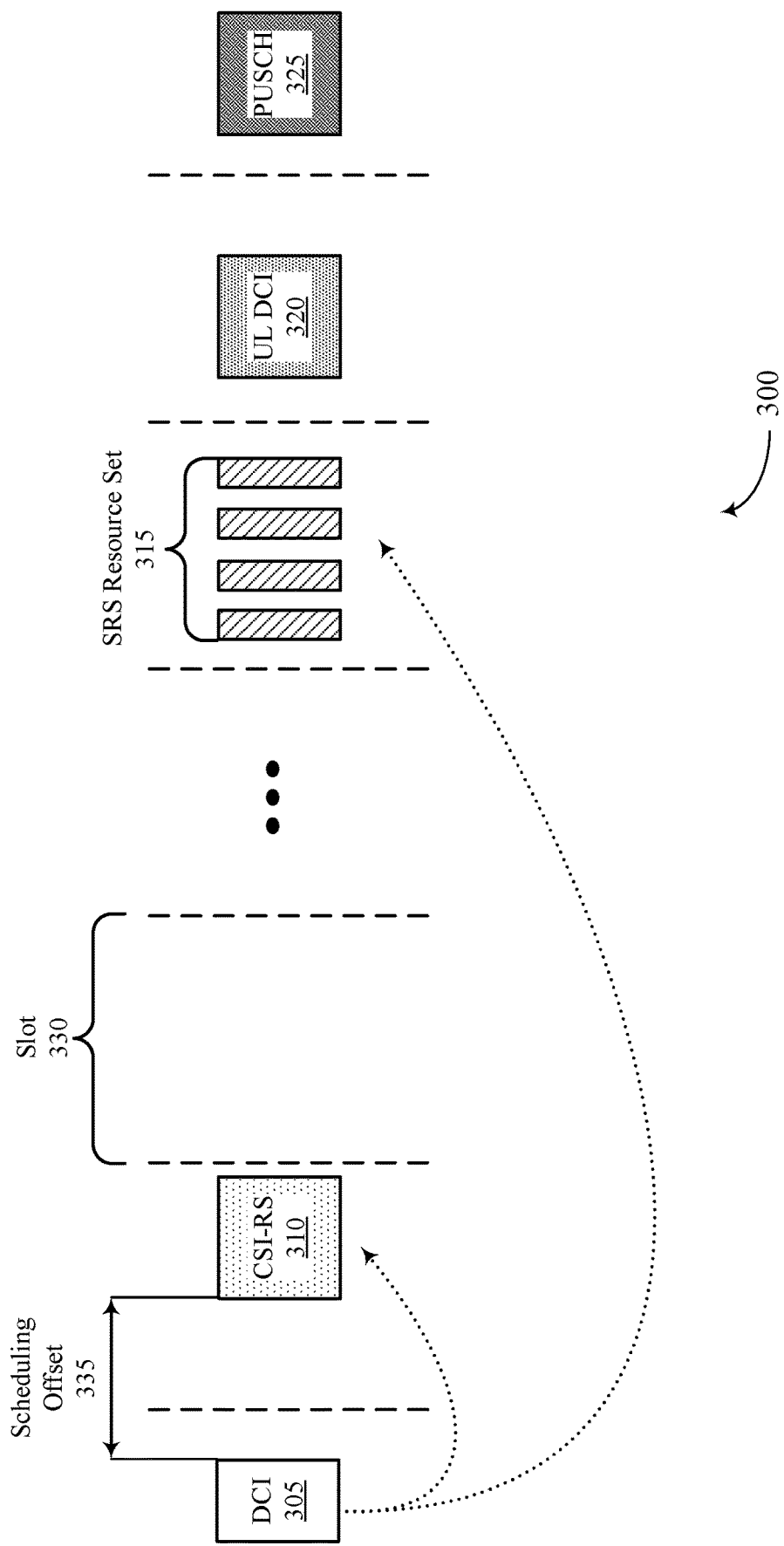
FIG. 3 illustrates an example of an aperiodic sounding reference signal (SRS) resource set configuration that supports beam switching techniques for uplink transmission in accordance with aspects of the present disclosure.

FIG. 3 illustrates an example of an aperiodic SRS resource set configuration 300 that supports beam switching techniques for uplink transmission in accordance with aspects of the present disclosure. In some examples, the aperiodic SRS resource set configuration 300 may implement aspects of wireless communications system 100.

As described with reference to FIG. 2, a UE 115 may be configured with an aperiodic SRS resource set 315 that is used for non-codebook uplink. The aperiodic SRS resource set 315 may be associated with a CSI-RS resource 310, which may be used to transmit non-zero power CSI-RS. The SRS resource set 315 and the CSI-RS resource may be configured for the UE 115 by a base station 105. For example, the SRS resource set configuration may be configured by RRC. In some cases, the UE 115 may be configured with a slot offset for the SRS resource set 315. The slot offset for the SRS resource set may indicate how many slots 330 there are between DCI 305 triggering the aperiodic SRS resource set and the SRS resource set 315. For example, if the slot offset for the SRS resource set is 4, the SRS resource set 315 may be in the fourth slot from the DCI 305.

Wireless communications systems described herein, such as wireless communications system 200, support a base station 105 to configure a UE 115 with a slot offset for the CSI-RS resource 310. The slot offset for the CSI-RS resource 310 may indicate a number of slots between the DCI 305 and the CSI-RS resource 310. By providing a slot offset between the DCI 305 and the CSI-RS resource 310, the UE 115 may have enough time to make a beam switch and measure the CSI-RS using a spatial QCL assumption.

For example, a UE 115 may receive the DCI 305, which triggers the CSI-RS resource 310 and the SRS resource set 315. The UE 115 may identify a slot offset of "1" for the CSI-RS resource 310 and determine that the CSI-RS resource 310 is in the next slot 330. In some cases, there may be at least a configured number of symbol periods between the CSI-RS resource 310 and the SRS resource set 315. For example, there may be at least 42 symbol periods between the CSI-RS resource 310 and the SRS resource set 315.

The UE 115 may determine a scheduling offset 335 between the DCI 305 and the CSI-RS resource 310. The scheduling offset 335 may be based on a number of symbols between a last symbol of the DCI 305 and a first symbol of the CSI-RS resource 310. The UE 115 may then compare the scheduling offset 335 to a beam switching capability of the UE 115.

If the beam switching capability of the UE 115 is smaller than the scheduling offset 335, the UE 115 may apply a TCI state of the CSI-RS resource 310. The TCI state may include one or more QCL assumption configurations, including a spatial QCL assumption or a Type D QCL assumption. In some cases, the TCI state for the CSI-RS resource 310 may be RRC configured (e.g., as part of configuring CSI-RS resources).

If a number of symbol periods corresponding to the beam switching capability of the UE 115 is greater than the scheduling offset 335, the UE 115 may implement techniques to determine a QCL assumption for receiving the CSI-RS resource 310. For example, there may not be enough symbol periods between the DCI 305 and the CSI-RS resource 310 for the UE 115 to determine the TCI state and switch beams. In some cases, if there is another downlink signal that overlaps a CSI-RS of the CSI-RS resource 310, the UE 115 may apply the QCL assumption of the other downlink signal to monitor the CSI-RS resource 310. In some cases, the UE 115 may apply a default QCL assumption based on a QCL assumption of a lowest ID control resource set of control resources sets monitored in a latest slot.

The UE 115 may then monitor the CSI-RS resource 310 and calculate an uplink precoder for the SRS resource set 315 based on a measurement of the CSI-RS resource 310. The DCI 305 may include an SRS request field, which indicates one or more SRS resource sets (e.g., including the SRS resource set with a usage parameter configured to non-codebook). The UE 115 may transmit SRS on the SRS resources of the indicated SRS resource set using the calculated precoder.

The base station 105 may receive the precoded SRS resources and choose one or more SRS resources to indicate in an uplink DCI 320 for uplink shared channel scheduling. The base station 105 may transmit the uplink DCI 320 to the UE 115 with an SRS resource indicator field, indicating one or more of the SRS resources of the SRS resource set 315. For example, the SRS resource indicator field may indicate SRS resource 0 and 2. Based on the SRS resource indicator field indicating two SRS resources, the uplink shared channel 325, may have two layers, where each layer is transmitted with the same precoding and beam as those used for transmission of the SRS resources 0 and 2. The UE 115 may then transmit the uplink shared channel 325 based on the indicated SRS resources.

Figure 4:
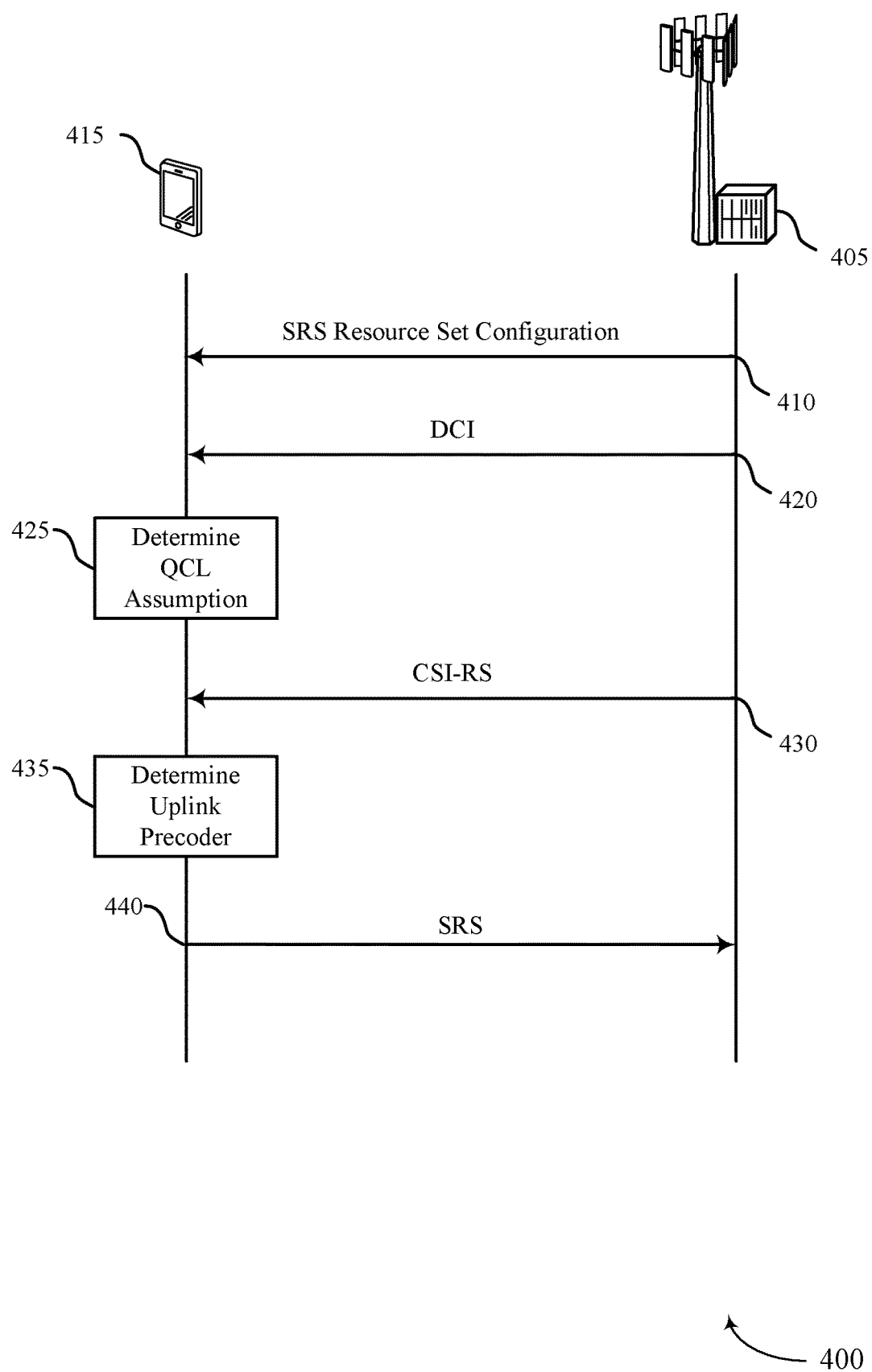
FIG. 4 illustrates an example of a process flow that supports beam switching techniques for uplink transmission in accordance with aspects of the present disclosure.

FIG. 4 illustrates an example of a process flow 400 that supports beam switching techniques for uplink transmission in accordance with aspects of the present disclosure. In some examples, process flow 400 may implement aspects of wireless communications system 100. Process flow 400 includes UE 415 and base station 405, which may be respective examples of a UE 115 and a base station 105 as described with reference to FIGS. 1 through 3. As described herein, base station 405 may configure UE 415 with SRS resources. UE 415 may transmit SRS using the configured SRS resources, and base station 405 may indicate one or more of the SRS resources for UE 415 to select a transmit configuration for an associated uplink transmission.

Base station 405 may transmit an SRS resource set configuration at 410. The SRS resource set configuration may indicate an aperiodic SRS resource set, an aperiodic downlink reference signal resource associated with the aperiodic SRS resource set, and a slot offset associated with the aperiodic downlink reference signal resource. In some cases, the aperiodic downlink reference signal resource may be an aperiodic CSI-RS resource, which may be allocated for transmission of NZP CSI-RS.

At 420, base station 405 may transmit DCI in a first slot, the DCI indicating that the aperiodic SRS resource set is triggered. The DCI may be, for example, uplink-based DCI, downlink-based DCI, or group common DCI. The DCI may include an SRS request field indicating one or more SRS resource sets, including at least the aperiodic SRS resource set.

At 425, UE 415 may determine a QCL assumption for the aperiodic downlink reference signal resource based on the slot offset associated with the aperiodic downlink reference signal resource. For example, UE 415 may determine a scheduling offset for the aperiodic downlink reference signal resource based on the slot offset, where the scheduling offset corresponds to a number of symbol periods between a last symbol period of the downlink control information and a first symbol period of the aperiodic downlink reference signal resource.

In some cases, UE 415 may determine a beam switching capability of UE 415 is smaller than a scheduling offset between the downlink control information and the aperiodic downlink reference signal resource. UE 415 may then identify a TCI state of the aperiodic downlink reference signal resource, where the QCL assumption is associated with the TCI state of the aperiodic downlink reference signal resource based on the beam switching capability being smaller than the scheduling offset. For example, if the beam switching capability indicates that UE 415 can switch beams within the scheduling offset, UE 415 may apply the TCI state of the CSI-RS resource.

In some cases, UE 415 may determine a beam switching capability of the UE is greater than a scheduling offset between the downlink control information and the aperiodic downlink reference signal resource. In some examples, UE 415 may detect a downlink signal scheduled to overlap with the aperiodic downlink reference signal resource, and the QCL assumption may be associated with the downlink signal based on the beam switching capability being greater than the scheduling offset. In some examples, such as if there is not an overlapping downlink signal, UE 415 may identify a default QCL assumption if the beam switching capability is greater than the scheduling offset At 430, base station 405 may transmit CSI-RS on the CSI-RS resource. UE 415 may measure the aperiodic downlink reference signal resource in a second slot indicated by the slot offset based on the QCL assumption. For example, the slot offset for the CSI-RS may indicate that the CSI-RS is in a next slot after the first slot with the DCI. UE 415 may apply the determined QCL assumption and monitor the CSI-RS resource in the indicated slot.

At 435, UE 415 may determine an uplink precoder for the aperiodic SRS resource set based on the measurement of the aperiodic CSI-RS resource. At 440, UE 415 may transmit SRS on SRS resources indicated by the SRS request field indicator (e.g., included in the DCI). UE 415 may use the precoded calculated based on the aperiodic CSI-RS measurement for the SRS transmissions.

Figure 5:
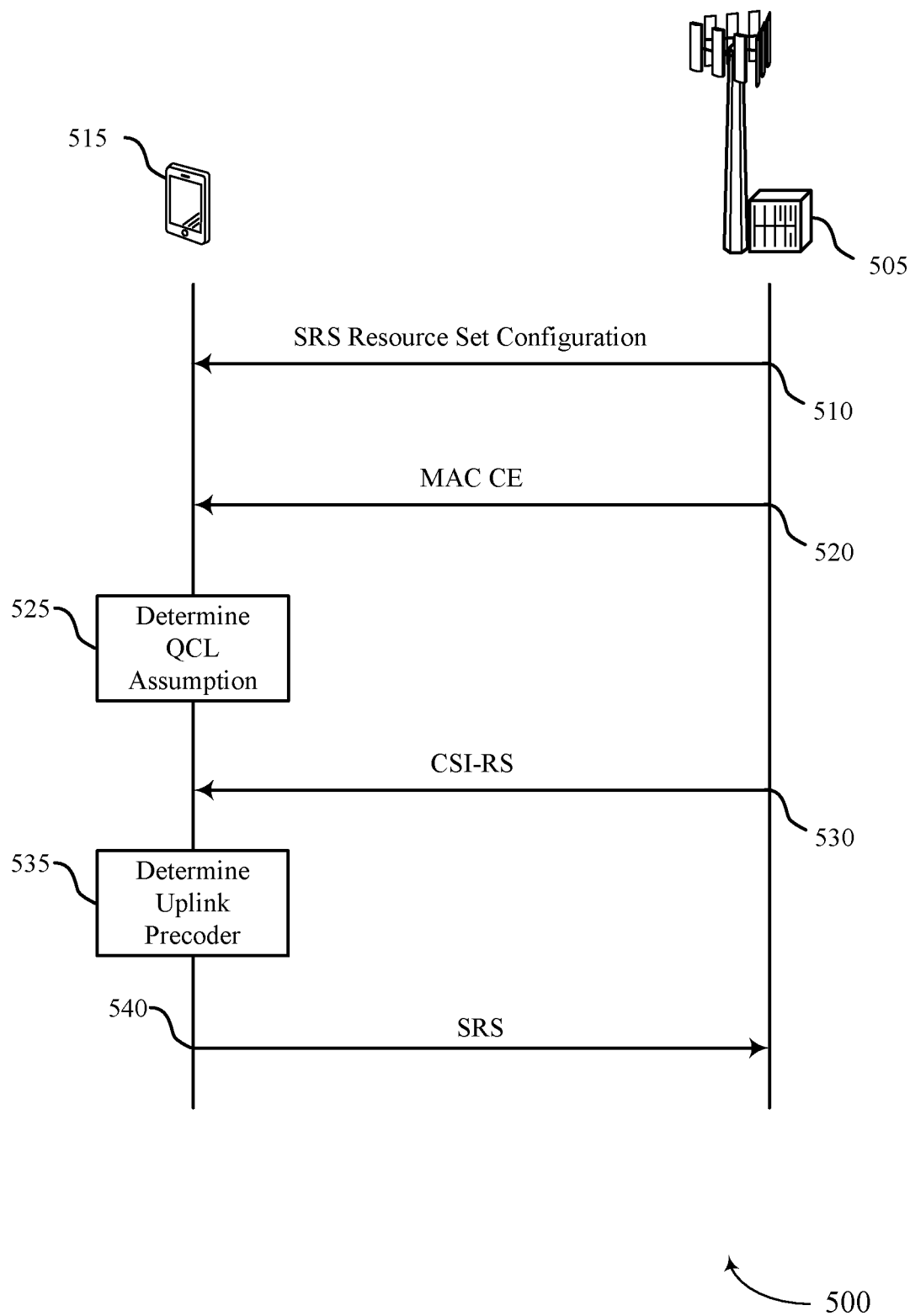
FIG. 5 illustrates an example of a process flow that supports beam switching techniques for uplink transmission in accordance with aspects of the present disclosure.

FIG. 5 illustrates an example of a process flow 500 that supports beam switching techniques for uplink transmission in accordance with aspects of the present disclosure. In some examples, process flow 500 may implement aspects of wireless communication system 100. Process flow 500 includes UE 515 and base station 505, which may be respective examples of a UE 115 and a base station 105 described with reference to FIGS. 1 through 4. As described herein, base station 505 may configure UE 515 with SRS resources. UE 515 may transmit SRS using the configured SRS resources, and base station 505 may indicate one or more of the SRS resources for UE 515 to select a transmit configuration for an associated uplink transmission.

Base station 505 may transmit an SRS resource set configuration at 510. The SRS resource set configuration may indicate an SRS resource set. In some cases, the SRS resource set configuration may indicate an NZP downlink reference signal resource associated with the SRS resource set. In some cases, the SRS resource set may be an aperiodic SRS resource set. In some cases, the SRS resource set may be a periodic or semi-persistent SRS resource.

At 520, base station 505 may transmit a MAC CE indicating a downlink reference signal resource associated with the SRS resource set. In some cases, the MAC CE may include an NZP CSI-RS identifier for the downlink reference signal resource, a sounding reference signal resource set identifier for the sounding reference signal resource set, a serving cell index, a bandwidth part identifier, or a combination thereof.

In some cases, such as if the SRS resource set is an aperiodic SRS resource set, the MAC CE may include an indicator for an aperiodic resource trigger for the SRS resource set, an aperiodic resource trigger list for the SRS resource set, a slot offset value for the SRS resource set, a slot offset for the downlink reference signal resource (e.g., as described with reference to FIG. 4), or a combination thereof.

At 525, UE 515 may determine a QCL assumption for the downlink reference signal resource. For example, the downlink reference signal resource may be associated with a TCI state, and UE 515 may use the QCL assumption of the TCI state. In some cases, the MAC CE may indicate a TCI state for the downlink reference signal resource. For example, UE 515 may be configured with the downlink reference signal resource via the SRS resource set configuration at 510, and the MAC CE received at 520 may indicate a TCI state for the downlink reference signal resource.

By transmitting the MAC CE to indicate the downlink reference signal resource, or a TCI state for the downlink reference signal resource, UE 515 may be able to switch uplink beams for the SRS resource set. For example, UE 515 may be indicated a downlink reference signal resource which is configured with a TCI state that has a more reliable or stronger beam. Therefore, by using the MAC CE, UE 515 may quickly switch uplink beams instead of waiting for RRC reconfiguration.

Figure 6:
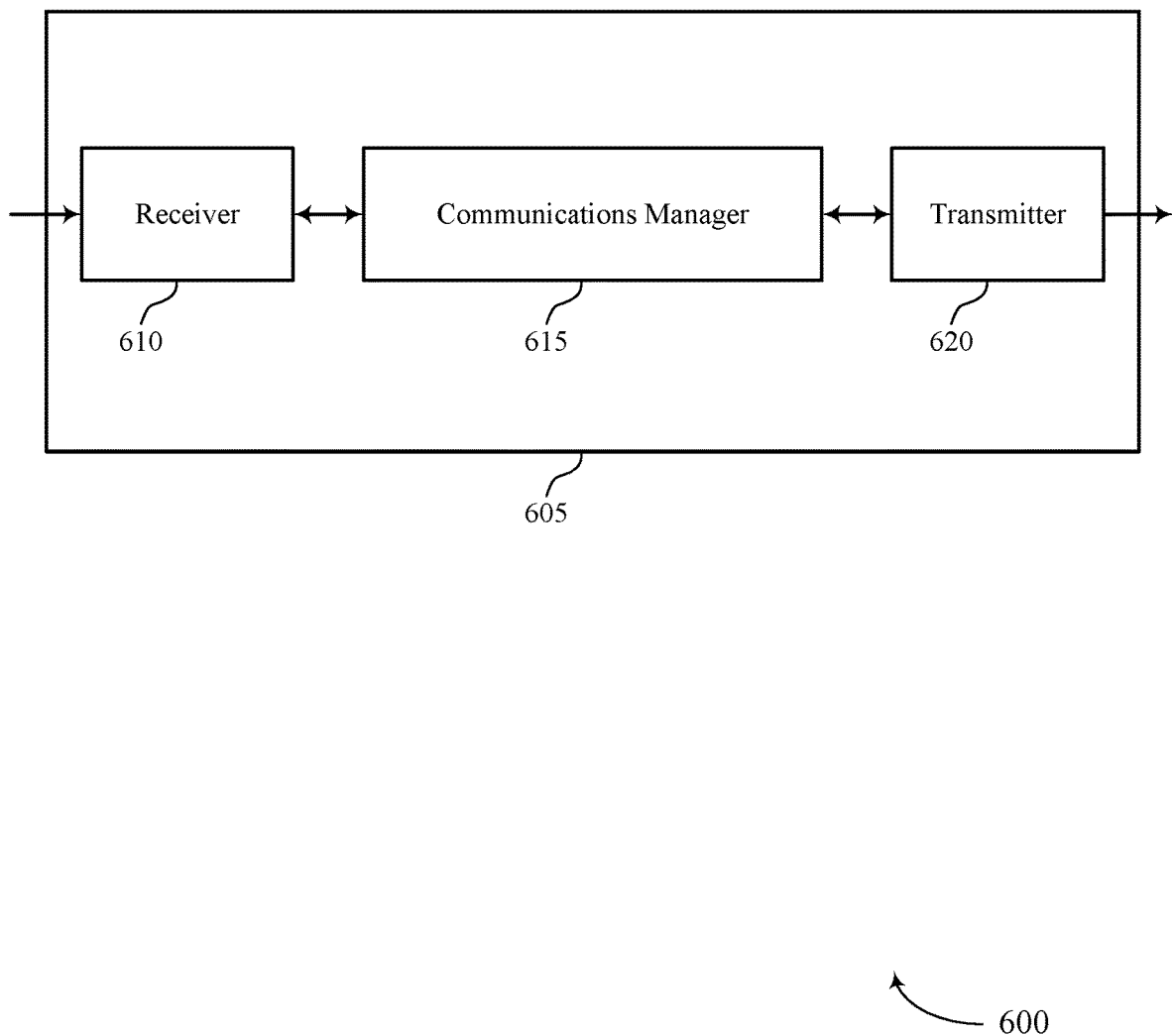
FIGS. 6 and 7 show block diagrams of devices that support beam switching techniques for uplink transmission in accordance with aspects of the present disclosure.

At 530, base station 505 may transmit CSI-RS on the CSI-RS resource. UE 515 may measure the downlink reference signal resource based on the QCL assumption. At 535, UE 515 may determine an uplink precoder for the aperiodic SRS resource set based on the measurement of the aperiodic CSI-RS resource. At 540, UE 515 may transmit SRS on SRS resources indicated by the SRS request field indicator (e.g., included in the DCI). UE 515 may use the precoded calculated based on the aperiodic CSI-RS measurement for the SRS transmissions FIG. 6 shows a block diagram 600 of a device 605 that supports beam switching techniques for uplink transmission in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to beam switching techniques for uplink transmission, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource, receive downlink control information in a first slot, the downlink control information indicating that the aperiodic sounding reference signal resource set is triggered, determine a quasi co-location assumption for the aperiodic downlink reference signal resource based on the slot offset associated with the aperiodic downlink reference signal resource, and measure the aperiodic downlink reference signal resource in a second slot indicated by the slot offset based on the quasi co-location assumption. The communications manager 615 may also receive a medium access control (MAC) control element (CE) indicating a downlink reference signal resource associated with a sounding reference signal resource set, determine a quasi co-location assumption for the downlink reference signal resource, and measure the downlink reference signal resource based on the quasi co-location assumption. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 615 as described herein may be implemented to realize one or more potential advantages. One implementation may allow a UE 115 to switch beams to measure an aperiodic downlink reference signal resource associated with an aperiodic SRS resource set. This may enable the UE 115 to determine a precoder for non-codebook based uplink transmissions based on measuring the aperiodic downlink reference signal resource. Without applying a spatial QCL assumption to measure the downlink reference signal resource, the UE 115 may not be able to measure the downlink reference signal resource, or the measurement may not be directional. By providing a gap between a triggering DCI and the downlink reference signal measurement, the UE 115 may be able to switch beams in time to apply the QCL assumption and measure the downlink reference signal resource.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
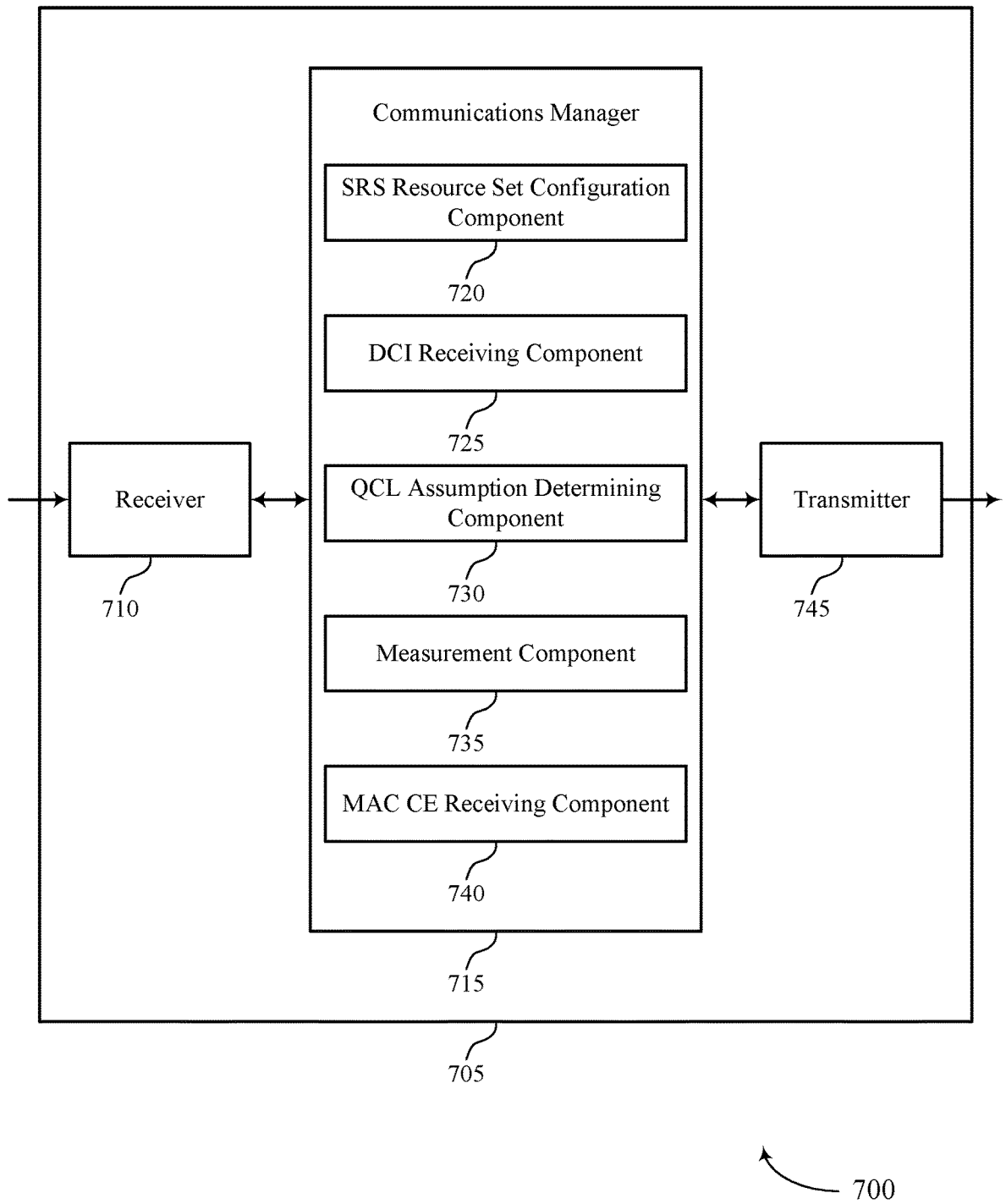

FIG. 7 shows a block diagram 700 of a device 705 that supports beam switching techniques for uplink transmission in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to beam switching techniques for uplink transmission, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a SRS resource set configuration component 720, a DCI receiving component 725, a QCL assumption determining component 730, a measurement component 735, and a MAC CE receiving component 740. The communications manager 715 may be an example of aspects of the communications manager 910 described herein.

The SRS resource set configuration component 720 may receive sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource.

The DCI receiving component 725 may receive downlink control information in a first slot, the downlink control information indicating that the aperiodic sounding reference signal resource set is triggered.

The QCL assumption determining component 730 may determine a quasi co-location assumption for the aperiodic downlink reference signal resource based on the slot offset associated with the aperiodic downlink reference signal resource. The measurement component 735 may measure the aperiodic downlink reference signal resource in a second slot indicated by the slot offset based on the quasi co-location assumption.

The MAC CE receiving component 740 may receive a MAC CE indicating a downlink reference signal resource associated with a sounding reference signal resource set. The QCL assumption determining component 730 may determine a quasi co-location assumption for the downlink reference signal resource. The measurement component 735 may measure the downlink reference signal resource based on the quasi co-location assumption.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
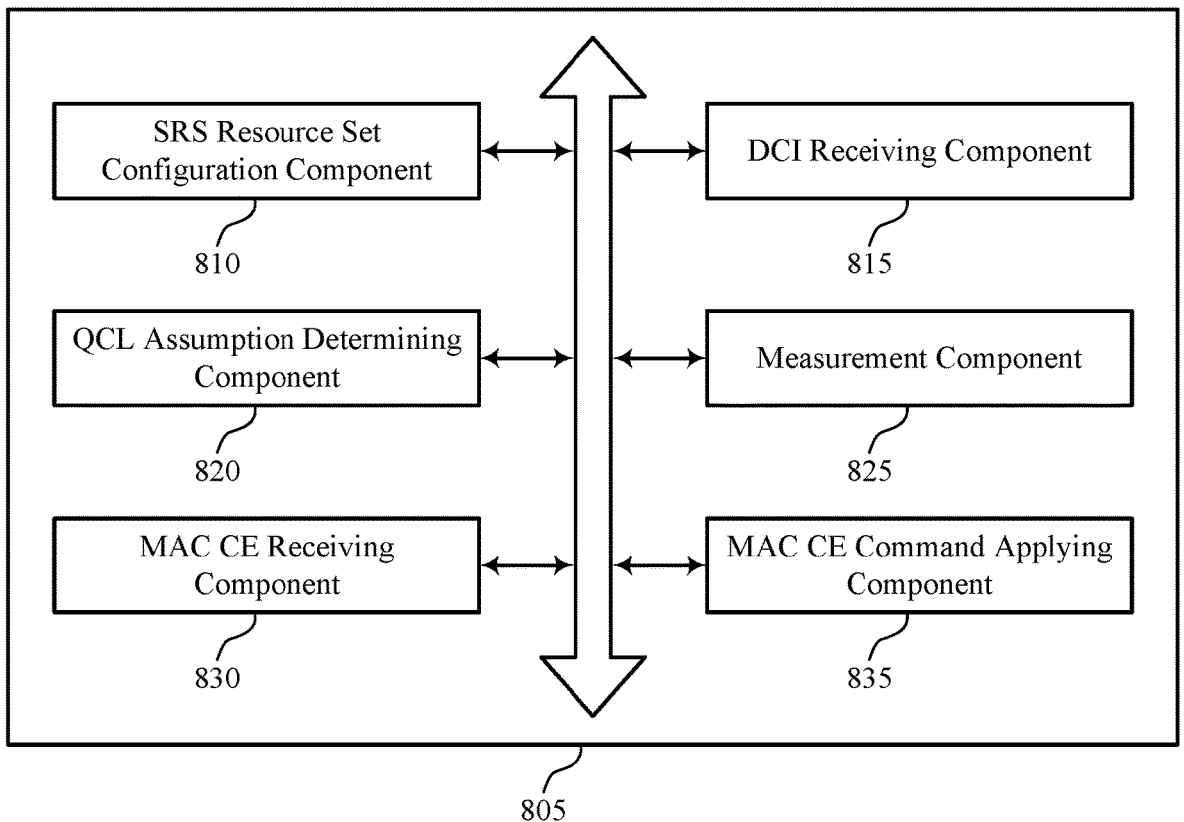
FIG. 8 shows a block diagram of a communications manager that supports beam switching techniques for uplink transmission in accordance with aspects of the present disclosure.

FIG. 8 shows a block diagram 800 of a communications manager 805 that supports beam switching techniques for uplink transmission in accordance with aspects of the present disclosure. The communications manager 805 may be an example of aspects of a communications manager 615, a communications manager 715, or a communications manager 910 described herein. The communications manager 805 may include a SRS resource set configuration component 810, a DCI receiving component 815, a QCL assumption determining component 820, a measurement component 825, a MAC CE receiving component 830, and a MAC CE command applying component 835. Each of these modules may communicate, directly or indirectly, with one another (e.g., via one or more buses).

The SRS resource set configuration component 810 may receive sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource.

In some examples, the SRS resource set configuration component 810 may determine a scheduling offset for the aperiodic downlink reference signal resource based on the slot offset, where the scheduling offset corresponds to a number of symbol periods between a last symbol period of the downlink control information and a first symbol period of the aperiodic downlink reference signal resource. In some examples, the SRS resource set configuration component 810 may identify a set of configured TCI states.

In some examples, the SRS resource set configuration component 810 may determine that all configured TCI states of the set of configured TCI states are not associated with a spatial quasi co-location assumption. In some examples, the SRS resource set configuration component 810 may determine the slot offset to be zero, where the aperiodic downlink reference signal resource is in the first slot with the downlink control information.

In some cases, the aperiodic sounding reference signal resource set configuration information is received in a radio resource control configuration. In some cases, the aperiodic downlink reference signal resource includes an aperiodic channel state information reference signal resource.

The DCI receiving component 815 may receive downlink control information in a first slot, the downlink control information indicating that the aperiodic sounding reference signal resource set is triggered. In some cases, the downlink control information includes group common downlink control information, uplink-based downlink control information, downlink-based downlink control information, or a combination thereof.

In some cases, the aperiodic downlink reference signal resource is triggered based on a sounding reference signal request field in the downlink control information. The QCL assumption determining component 820 may determine a quasi co-location assumption for the aperiodic downlink reference signal resource based on the slot offset associated with the aperiodic downlink reference signal resource. In some examples, the QCL assumption determining component 820 may determine a quasi co-location assumption for the downlink reference signal resource.

In some examples, the QCL assumption determining component 820 may determine a beam switching capability of the UE is smaller than a scheduling offset between the downlink control information and the aperiodic downlink reference signal resource. In some examples, the QCL assumption determining component 820 may identify a TCI state of the aperiodic downlink reference signal resource, where the quasi co-location assumption is associated with the TCI state of the aperiodic downlink reference signal resource based on the beam switching capability being smaller than the scheduling offset.

In some examples, the QCL assumption determining component 820 may determine a beam switching capability of the UE is greater than a scheduling offset between the downlink control information and the aperiodic downlink reference signal resource. In some examples, the QCL assumption determining component 820 may detect a downlink signal scheduled to overlap with the aperiodic downlink reference signal resource, where the quasi co-location assumption is associated with the downlink signal based on the beam switching capability being greater than the scheduling offset. In some examples, the QCL assumption determining component 820 may identify a default quasi co-location assumption, where the quasi co-location assumption is the default quasi co-location assumption based on the beam switching capability being greater than the scheduling offset. In some examples, the QCL assumption determining component 820 may receive a configuration for the aperiodic downlink reference signal resource including a TCI state associated with the aperiodic downlink reference signal resource.

In some examples, the QCL assumption determining component 820 may receive, by the MAC CE, a TCI state for the downlink reference signal resource, where the quasi co-location assumption is based on the TCI state for the downlink reference signal resource. In some cases, the default quasi co-location assumption is associated with a control resource set with a lowest control resource identifier among control resource sets monitored in a latest slot.

The measurement component 825 may measure the aperiodic downlink reference signal resource in a second slot indicated by the slot offset based on the quasi co-location assumption. In some examples, the measurement component 825 may measure the downlink reference signal resource based on the quasi co-location assumption.

The MAC CE receiving component 830 may receive a MAC CE indicating a downlink reference signal resource associated with a sounding reference signal resource set. In some cases, the MAC CE includes a non-zero power (NZP) CSI-RS identifier for the downlink reference signal resource, a sounding reference signal resource set identifier for the sounding reference signal resource set, a serving cell index, a bandwidth part identifier, or a combination thereof.

In some cases, the MAC CE includes an indicator for an aperiodic resource trigger for the sounding reference signal resource set, an aperiodic resource trigger list for the sounding reference signal resource set, a slot offset value for the sounding reference signal resource set, a slot offset for the downlink reference signal resource, or a combination thereof. In some cases, the sounding reference signal resource set is an aperiodic resource set, a periodic resource set, or a semi-persistent resource set. The MAC CE command applying component 835 may apply a command associated with the MAC CE after transmitting feedback for a downlink shared channel message including the MAC CE.

Figure 9:
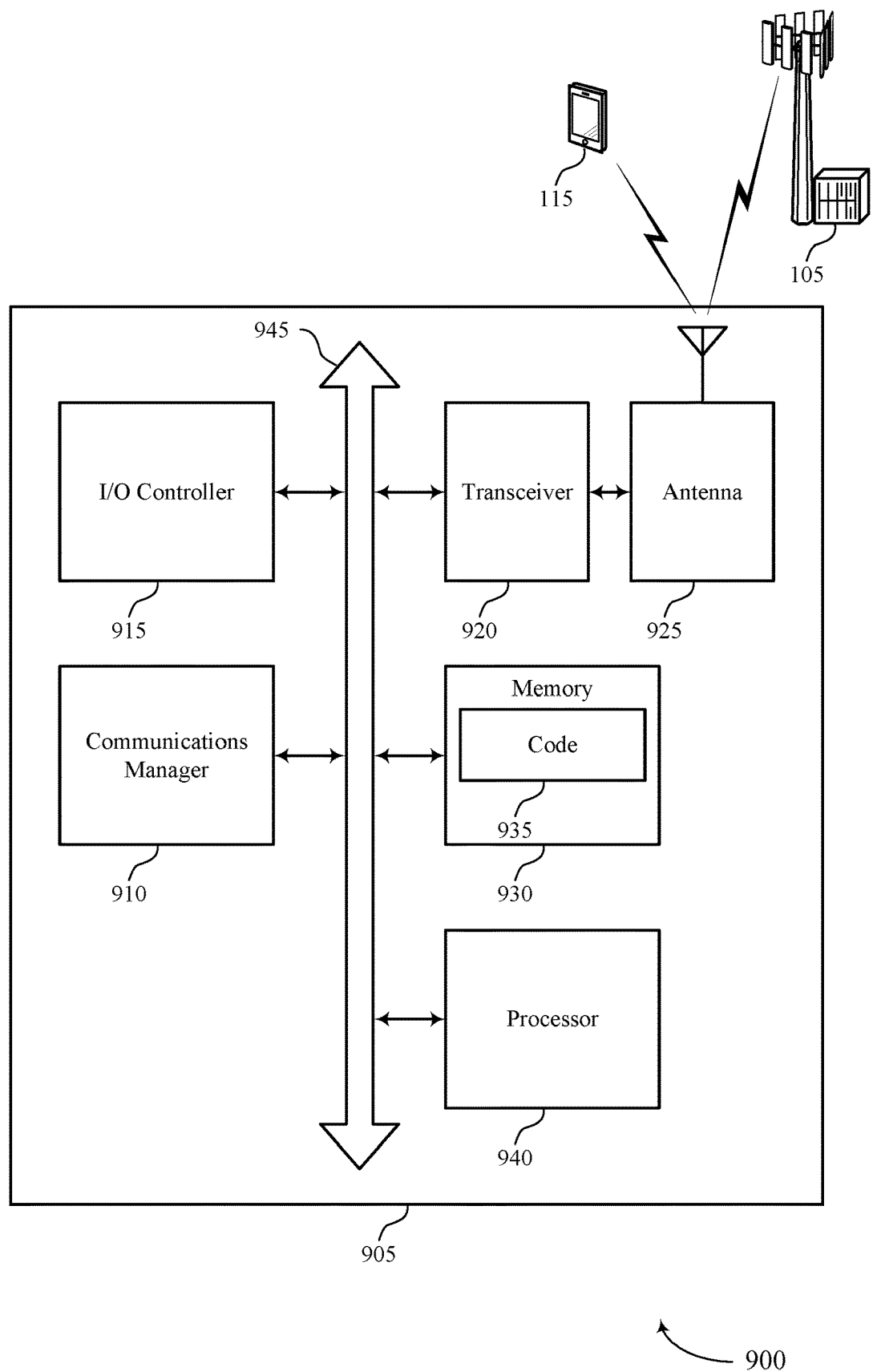
FIG. 9 shows a diagram of a system including a device that supports beam switching techniques for uplink transmission in accordance with aspects of the present disclosure.

FIG. 9 shows a diagram of a system 900 including a device 905 that supports beam switching techniques for uplink transmission in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource, receive downlink control information in a first slot, the downlink control information indicating that the aperiodic sounding reference signal resource set is triggered, determine a quasi co-location assumption for the aperiodic downlink reference signal resource based on the slot offset associated with the aperiodic downlink reference signal resource, and measure the aperiodic downlink reference signal resource in a second slot indicated by the slot offset based on the quasi co-location assumption. The communications manager 910 may also receive a medium access control (MAC) control element (CE) indicating a downlink reference signal resource associated with a sounding reference signal resource set, determine a quasi co-location assumption for the downlink reference signal resource, and measure the downlink reference signal resource based on the quasi co-location assumption.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting beam switching techniques for uplink transmission).

Based on configuring a UE 115 with a downlink reference signal resource via MAC CE, the UE 115 may be able to quickly update an uplink beam for transmission on an SRS resource set. With fast updating for the uplink beam, the transceiver 920 may transmit using a stronger beam. This may improve uplink transmission quality of uplink shared channel transmissions, as the beam configurations for the uplink shared channel transmission are based on the transmission configuration for the SRS resource set. This may reduce a number of failed transmissions, which would cause battery waste for the UE 115.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
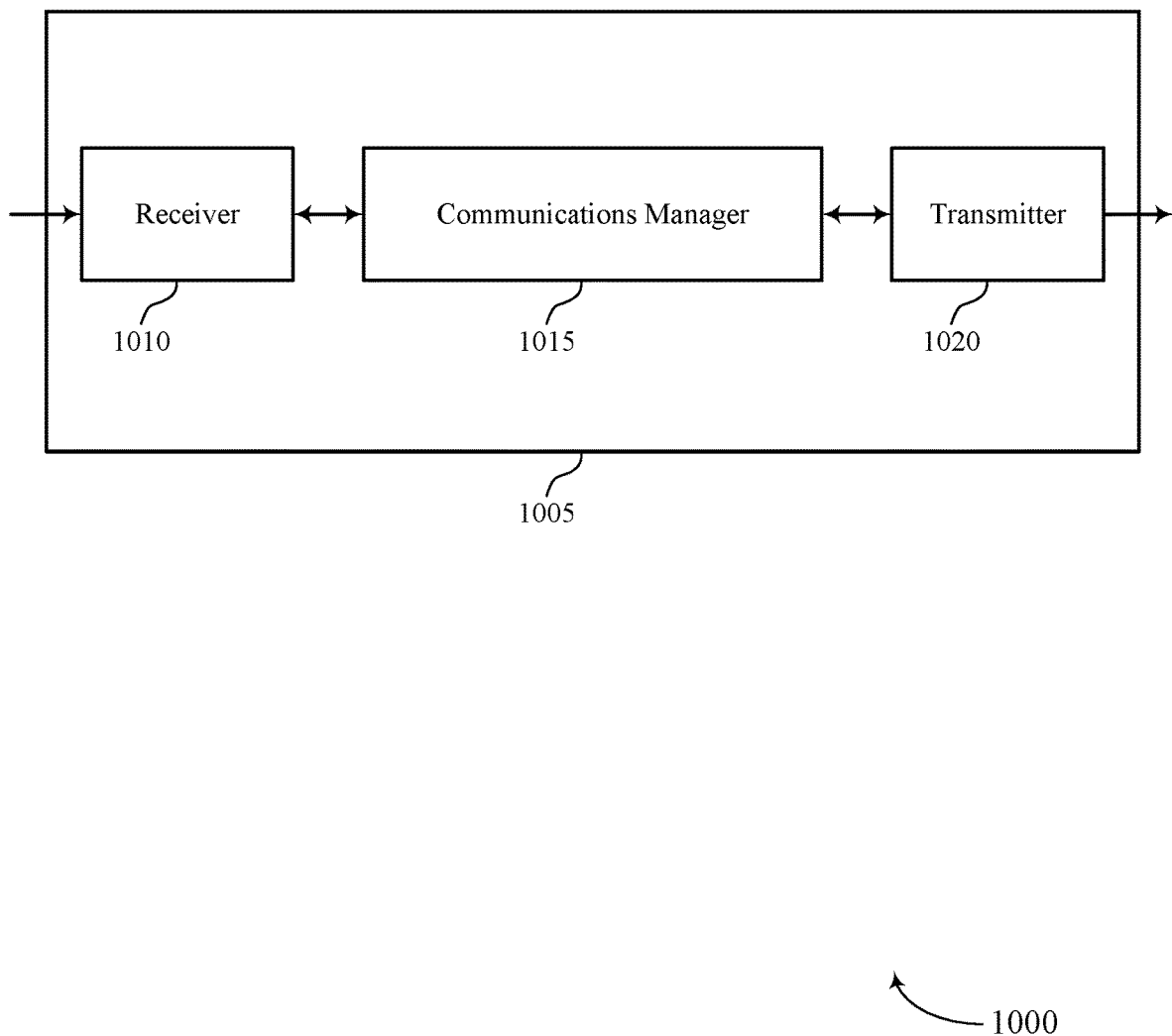
FIGS. 10 and 11 show block diagrams of devices that support beam switching techniques for uplink transmission in accordance with aspects of the present disclosure.

FIG. 10 shows a block diagram 1000 of a device 1005 that supports beam switching techniques for uplink transmission in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to beam switching techniques for uplink transmission, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource, transmit downlink control information in a first slot, the downlink control information indicating that the aperiodic sounding reference signal resource set is triggered, determine a quasi co-location assumption for the aperiodic downlink reference signal resource based on the slot offset associated with the aperiodic downlink reference signal resource, and transmit the aperiodic downlink reference signal resource in a second slot indicated by the first slot based on the quasi co-location assumption. The communications manager 1015 may also transmit a medium access control (MAC) control element (CE) indicating a downlink reference signal resource associated with a sounding reference signal resource set, determine a quasi co-location assumption for the downlink reference signal resource, and transmit the downlink reference signal resource based on the quasi co-location assumption. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
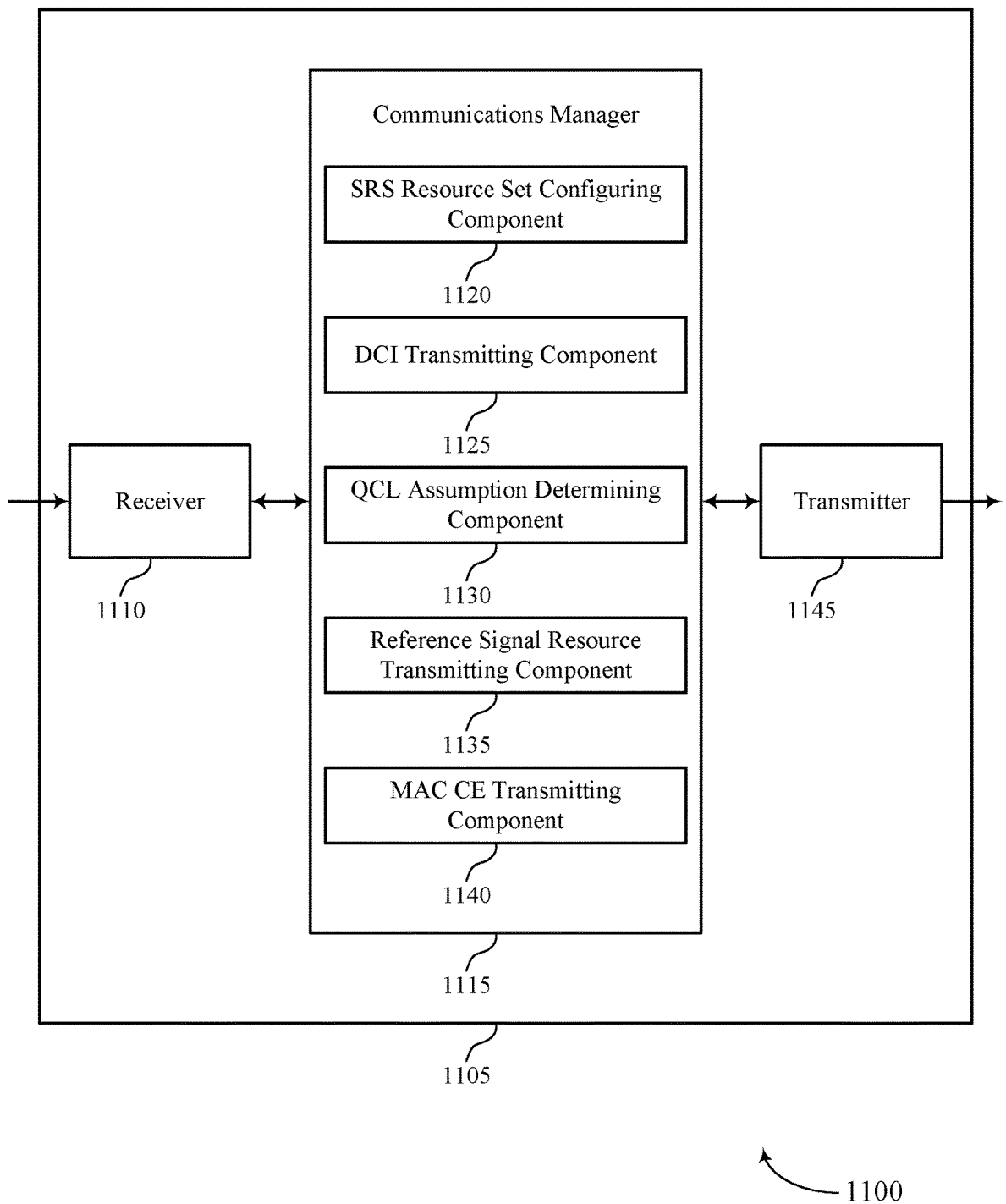

FIG. 11 shows a block diagram 1100 of a device 1105 that supports beam switching techniques for uplink transmission in accordance with aspects of the present disclosure. The device 1105 may be an example of aspects of a device 1005, or a base station 105 as described herein. The device 1105 may include a receiver 1110, a communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to beam switching techniques for uplink transmission, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a SRS resource set configuring component 1120, a DCI transmitting component 1125, a QCL assumption determining component 1130, a reference signal resource transmitting component 1135, and a MAC CE transmitting component 1140. The communications manager 1115 may be an example of aspects of the communications manager 1310 described herein.

The SRS resource set configuring component 1120 may transmit, to a UE, sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource. The DCI transmitting component 1125 may transmit downlink control information in a first slot, the downlink control information indicating that the aperiodic sounding reference signal resource set is triggered. The QCL assumption determining component 1130 may determine a quasi co-location assumption for the aperiodic downlink reference signal resource based on the slot offset associated with the aperiodic downlink reference signal resource. The reference signal resource transmitting component 1135 may transmit the aperiodic downlink reference signal resource in a second slot indicated by the first slot based on the quasi co-location assumption.

The MAC CE transmitting component 1140 may transmit a MAC CE indicating a downlink reference signal resource associated with a sounding reference signal resource set. The QCL assumption determining component 1130 may determine a quasi co-location assumption for the downlink reference signal resource. The reference signal resource transmitting component 1135 may transmit the downlink reference signal resource based on the quasi co-location assumption.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
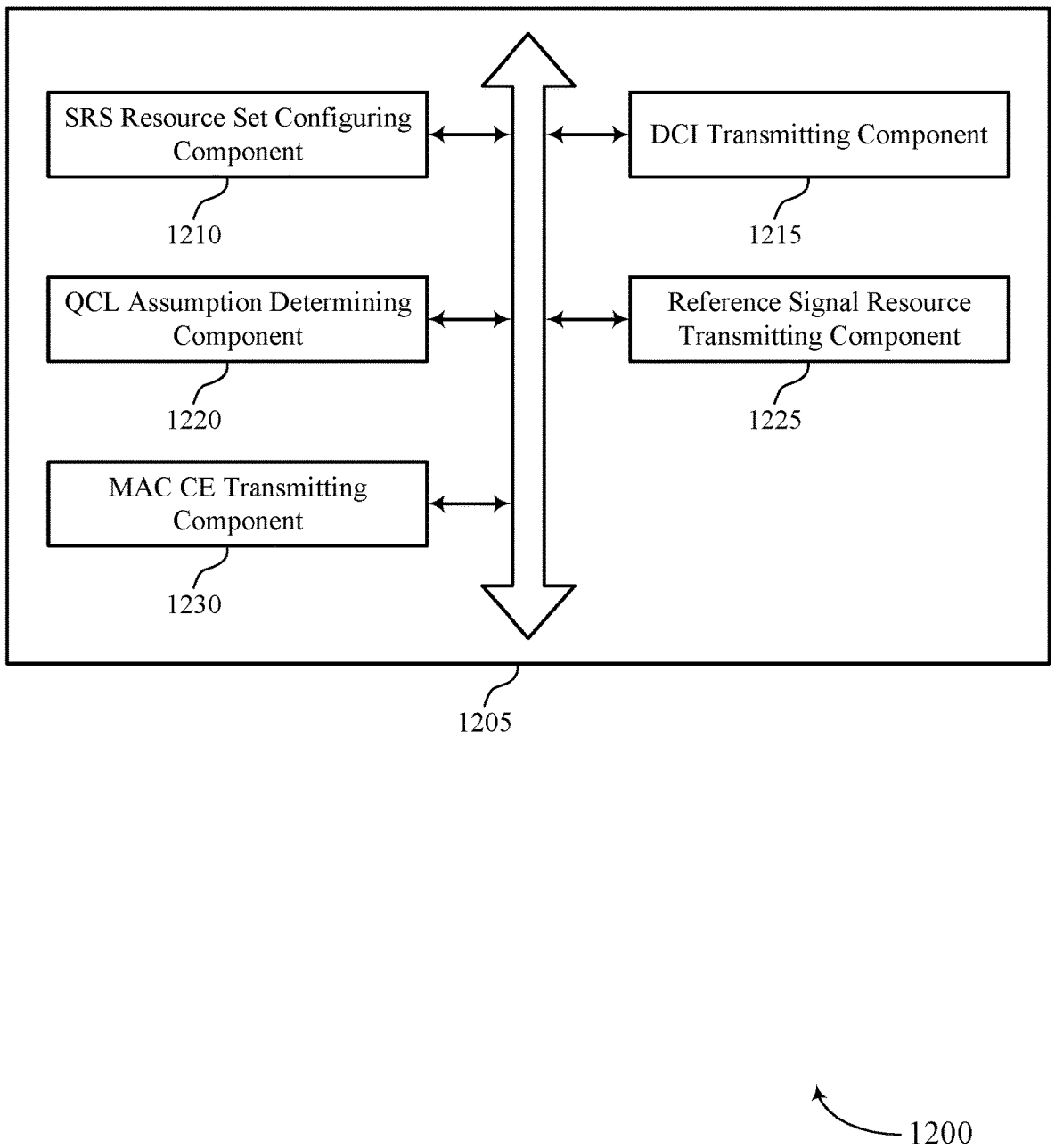
FIG. 12 shows a block diagram of a communications manager that supports beam switching techniques for uplink transmission in accordance with aspects of the present disclosure.

FIG. 12 shows a block diagram 1200 of a communications manager 1205 that supports beam switching techniques for uplink transmission in accordance with aspects of the present disclosure. The communications manager 1205 may be an example of aspects of a communications manager 1015, a communications manager 1115, or a communications manager 1310 described herein. The communications manager 1205 may include a SRS resource set configuring component 1210, a DCI transmitting component 1215, a QCL assumption determining component 1220, a reference signal resource transmitting component 1225, and a MAC CE transmitting component 1230. Each of these modules may communicate, directly or indirectly, with one another (e.g., via one or more buses).

The SRS resource set configuring component 1210 may transmit, to a UE, sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource. In some examples, the SRS resource set configuring component 1210 may determine a scheduling offset for the aperiodic downlink reference signal resource based on the slot offset, where the scheduling offset corresponds to a number of symbol periods between a last symbol period of the downlink control information and a first symbol period of the aperiodic downlink reference signal resource. In some cases, the aperiodic sounding reference signal resource set configuration information is transmitted in a radio resource control configuration. In some cases, the aperiodic downlink reference signal resource includes a channel state information reference signal resource.

The DCI transmitting component 1215 may transmit downlink control information in a first slot, the downlink control information indicating that the aperiodic sounding reference signal resource set is triggered. In some examples, the DCI transmitting component 1215 may trigger the aperiodic downlink reference signal resource based on a sounding reference signal request field in the downlink control information. In some cases, the downlink control information includes group common downlink control information, uplink-based downlink control information, downlink-based downlink control information, or a combination thereof.

The QCL assumption determining component 1220 may determine a quasi co-location assumption for the aperiodic downlink reference signal resource based on the slot offset associated with the aperiodic downlink reference signal resource. In some examples, the QCL assumption determining component 1220 may determine a quasi co-location assumption for the downlink reference signal resource. In some examples, the QCL assumption determining component 1220 may determine a beam switching capability of the UE is smaller than a scheduling offset between the downlink control information and the aperiodic downlink reference signal resource. In some examples, the QCL assumption determining component 1220 may identify a TCI state of the aperiodic downlink reference signal resource, where the quasi co-location assumption is associated with the TCI state of the aperiodic downlink reference signal resource based on the beam switching capability of the UE being smaller than the scheduling offset.

In some examples, the QCL assumption determining component 1220 may determine a beam switching capability of the UE is greater than a scheduling offset between the downlink control information and the aperiodic downlink reference signal resource. In some examples, the QCL assumption determining component 1220 may identify a downlink signal scheduled to overlap with the aperiodic downlink reference signal resource, where the quasi co-location assumption is associated with the downlink signal based on the beam switching capability of the UE being greater than the scheduling offset. In some examples, the QCL assumption determining component 1220 may identify a default quasi co-location assumption, where the quasi co-location assumption is the default quasi co-location assumption based on the beam switching capability of the UE being greater than the scheduling offset.

In some examples, the QCL assumption determining component 1220 may transmit a configuration for the aperiodic downlink reference signal resource including a TCI state associated with the aperiodic downlink reference signal resource. In some examples, the QCL assumption determining component 1220 may indicate, by the MAC CE, a TCI state for the downlink reference signal resource, where the quasi co-location assumption is based on the TCI state for the downlink reference signal resource.

The reference signal resource transmitting component 1225 may transmit the aperiodic downlink reference signal resource in a second slot indicated by the first slot based on the quasi co-location assumption. In some examples, the reference signal resource transmitting component 1225 may transmit the downlink reference signal resource based on the quasi co-location assumption.

The MAC CE transmitting component 1230 may transmit a MAC CE indicating a downlink reference signal resource associated with a sounding reference signal resource set. In some cases, the MAC CE includes an NZP CSI-RS identifier for the downlink reference signal resource, a sounding reference signal resource set identifier for the sounding reference signal resource set, a serving cell index, a bandwidth part identifier, or a combination thereof. In some cases, the MAC CE includes an indicator for an aperiodic resource trigger for the sounding reference signal resource set, an aperiodic resource trigger list for the sounding reference signal resource set, a slot offset value for the sounding reference signal resource set, a slot offset for the downlink reference signal resource, or a combination thereof. In some cases, the sounding reference signal resource set is an aperiodic resource set, a periodic resource set, or a semi-persistent resource set.

Figure 13:
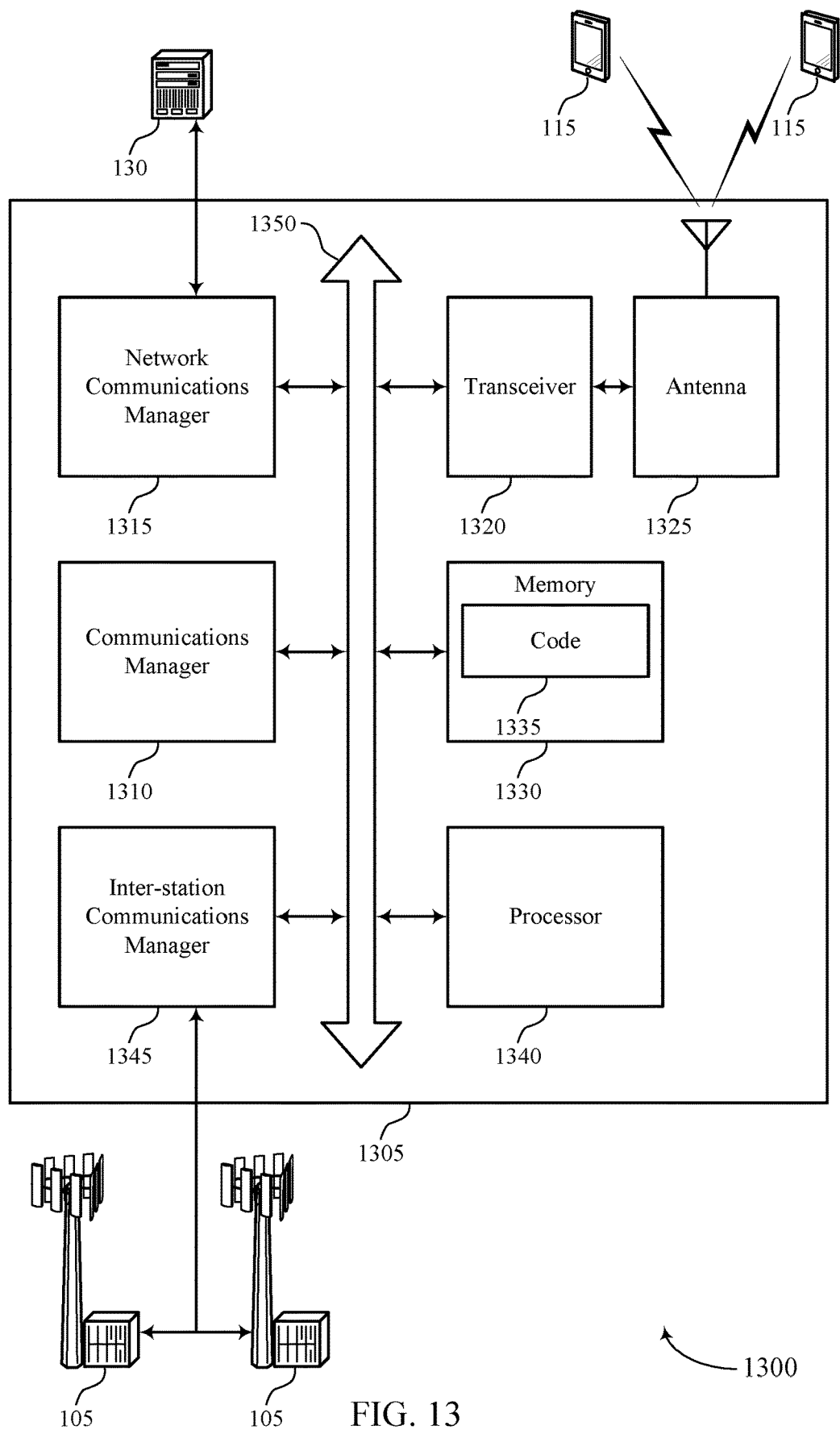
FIG. 13 shows a diagram of a system including a device that supports beam switching techniques for uplink transmission in accordance with aspects of the present disclosure.

FIG. 13 shows a diagram of a system 1300 including a device 1305 that supports beam switching techniques for uplink transmission in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource, transmit downlink control information in a first slot, the downlink control information indicating that the aperiodic sounding reference signal resource set is triggered, determine a quasi co-location assumption for the aperiodic downlink reference signal resource based on the slot offset associated with the aperiodic downlink reference signal resource, and transmit the aperiodic downlink reference signal resource in a second slot indicated by the first slot based on the quasi co-location assumption. The communications manager 1310 may also transmit a medium access control (MAC) control element (CE) indicating a downlink reference signal resource associated with a sounding reference signal resource set, determine a quasi co-location assumption for the downlink reference signal resource, and transmit the downlink reference signal resource based on the quasi co-location assumption.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting beam switching techniques for uplink transmission).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
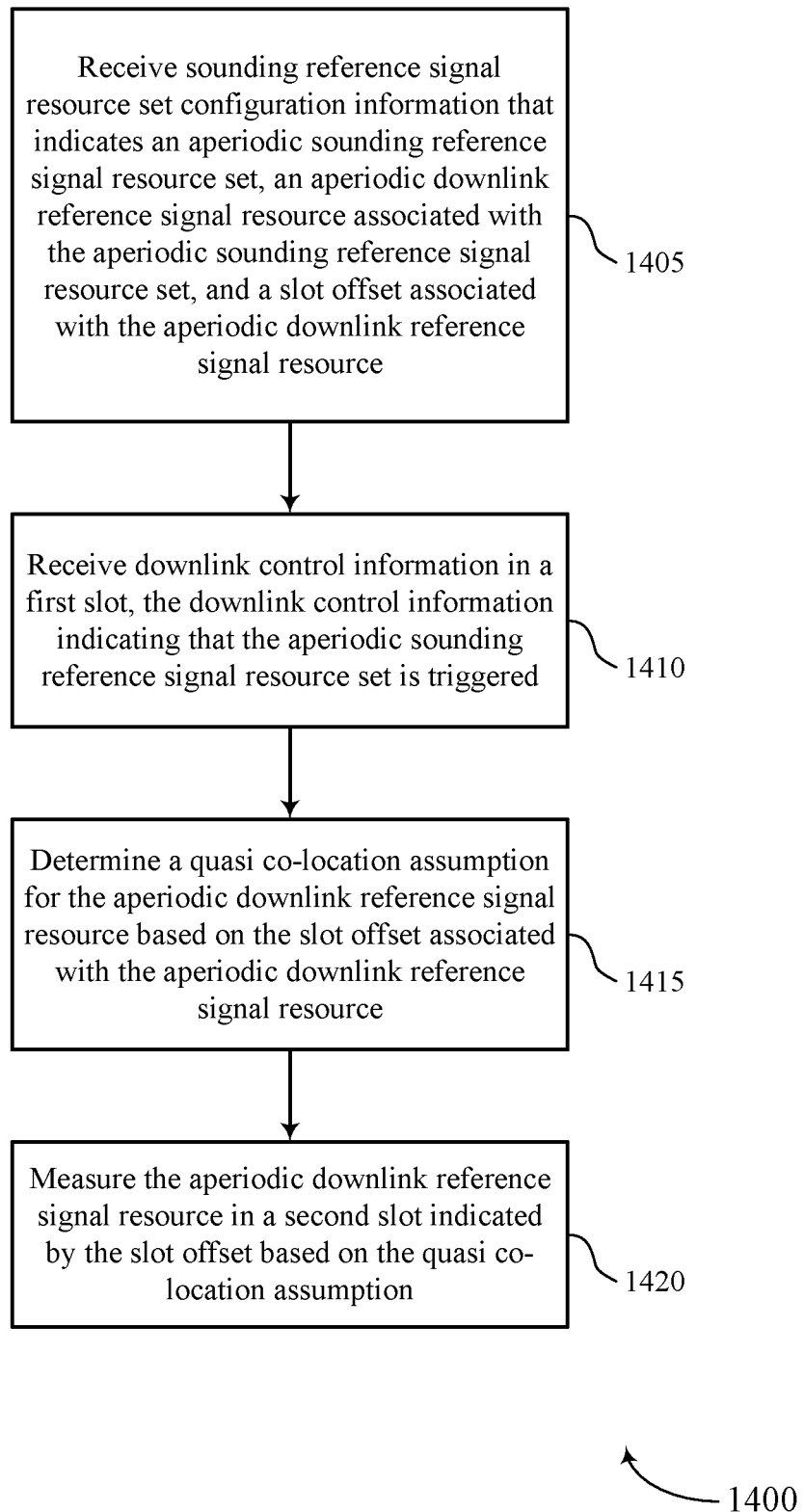
FIGS. 14 through 18 show flowcharts illustrating methods that support beam switching techniques for uplink transmission in accordance with aspects of the present disclosure.

FIG. 14 shows a flowchart illustrating a method 1400 that supports beam switching techniques for uplink transmission in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource. The operations of 1405 may be performed according to the methods described herein. In some examples, aspects of the operations of 1405 may be performed by a SRS resource set configuration component as described with reference to FIGS. 6 through 9.

At 1410, the UE may receive downlink control information in a first slot, the downlink control information indicating that the aperiodic sounding reference signal resource set is triggered. The operations of 1410 may be performed according to the methods described herein. In some examples, aspects of the operations of 1410 may be performed by a DCI receiving component as described with reference to FIGS. 6 through 9.

At 1415, the UE may determine a quasi co-location assumption for the aperiodic downlink reference signal resource based on the slot offset associated with the aperiodic downlink reference signal resource. The operations of 1415 may be performed according to the methods described herein. In some examples, aspects of the operations of 1415 may be performed by a QCL assumption determining component as described with reference to FIGS. 6 through 9.

At 1420, the UE may measure the aperiodic downlink reference signal resource in a second slot indicated by the slot offset based on the quasi co-location assumption. The operations of 1420 may be performed according to the methods described herein. In some examples, aspects of the operations of 1420 may be performed by a measurement component as described with reference to FIGS. 6 through 9.

Figure 15:
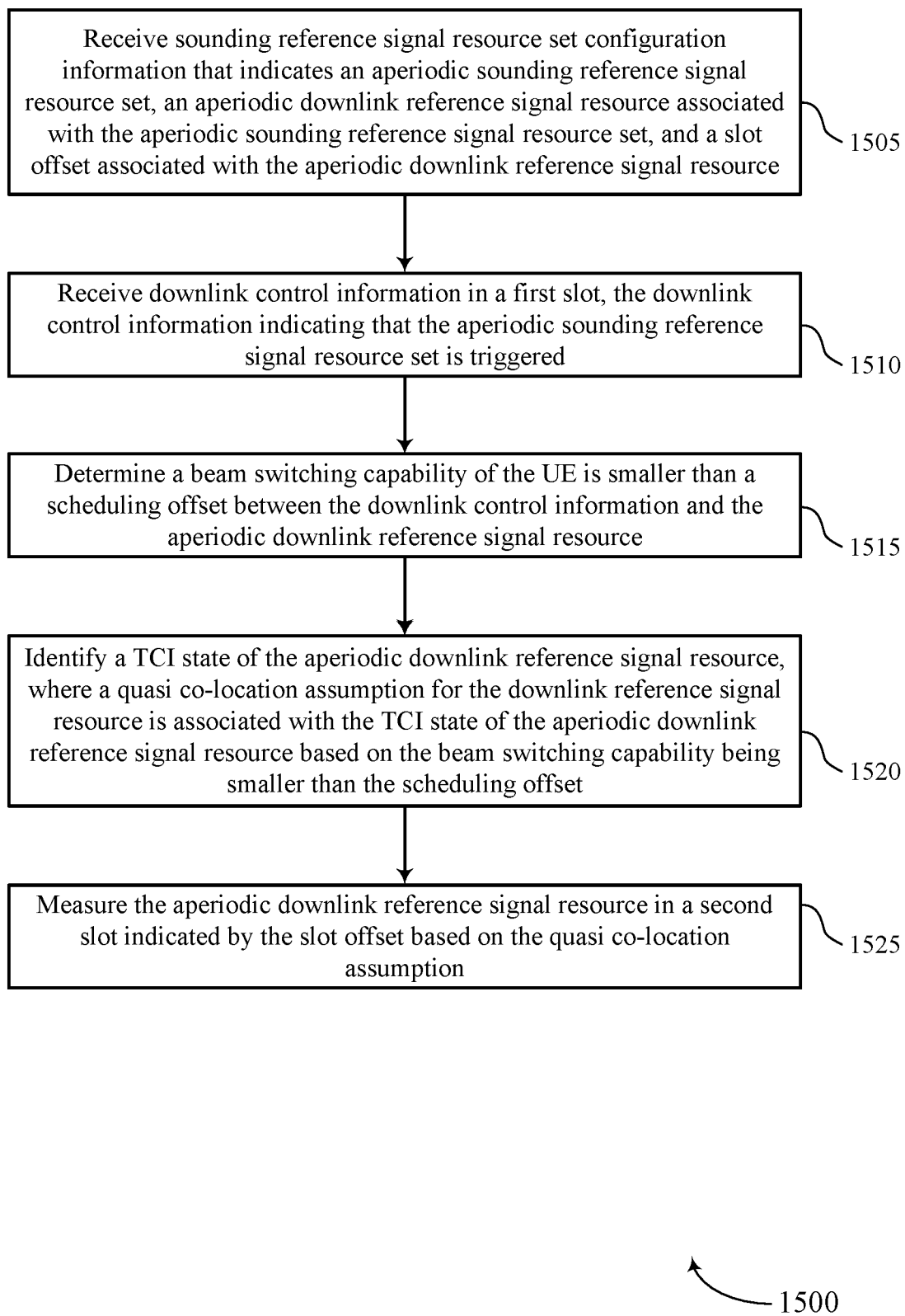

FIG. 15 shows a flowchart illustrating a method 1500 that supports beam switching techniques for uplink transmission in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource. The operations of 1505 may be performed according to the methods described herein. In some examples, aspects of the operations of 1505 may be performed by a SRS resource set configuration component as described with reference to FIGS. 6 through 9.

At 1510, the UE may receive downlink control information in a first slot, the downlink control information indicating that the aperiodic sounding reference signal resource set is triggered. The operations of 1510 may be performed according to the methods described herein. In some examples, aspects of the operations of 1510 may be performed by a DCI receiving component as described with reference to FIGS. 6 through 9.

At 1515, the UE may determine a beam switching capability of the UE is smaller than a scheduling offset between the downlink control information and the aperiodic downlink reference signal resource. The operations of 1520 may be performed according to the methods described herein. In some examples, aspects of the operations of 1520 may be performed by a QCL assumption determining component as described with reference to FIGS. 6 through 9.

At 1520, the UE may identify a TCI state of the aperiodic downlink reference signal resource, where a quasi co-location assumption for the downlink reference signal resource is associated with the TCI state of the aperiodic downlink reference signal resource based on the beam switching capability being smaller than the scheduling offset. The operations of 1525 may be performed according to the methods described herein. In some examples, aspects of the operations of 1525 may be performed by a QCL assumption determining component as described with reference to FIGS. 6 through 9.

At 1525, the UE may measure the aperiodic downlink reference signal resource in a second slot indicated by the slot offset based on the quasi co-location assumption. The operations of 1530 may be performed according to the methods described herein. In some examples, aspects of the operations of 1530 may be performed by a measurement component as described with reference to FIGS. 6 through 9.

Figure 16:
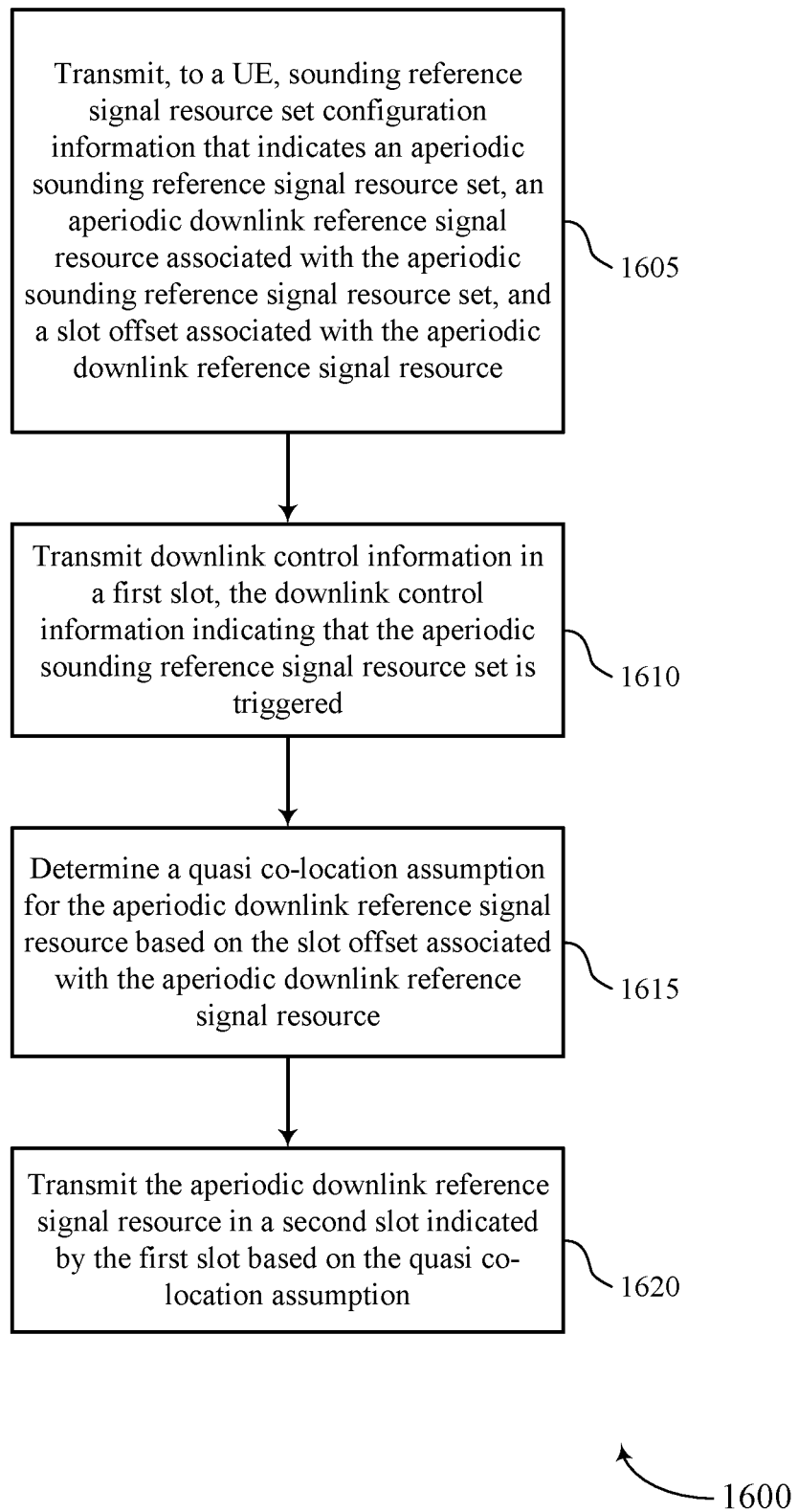

FIG. 16 shows a flowchart illustrating a method 1600 that supports beam switching techniques for uplink transmission in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource. The operations of 1605 may be performed according to the methods described herein. In some examples, aspects of the operations of 1605 may be performed by a SRS resource set configuring component as described with reference to FIGS. 10 through 13.

At 1610, the base station may transmit downlink control information in a first slot, the downlink control information indicating that the aperiodic sounding reference signal resource set is triggered. The operations of 1610 may be performed according to the methods described herein. In some examples, aspects of the operations of 1610 may be performed by a DCI transmitting component as described with reference to FIGS. 10 through 13.

At 1615, the base station may determine a quasi co-location assumption for the aperiodic downlink reference signal resource based on the slot offset associated with the aperiodic downlink reference signal resource. The operations of 1615 may be performed according to the methods described herein. In some examples, aspects of the operations of 1615 may be performed by a QCL assumption determining component as described with reference to FIGS. 10 through 13.

At 1620, the base station may transmit the aperiodic downlink reference signal resource in a second slot indicated by the first slot based on the quasi co-location assumption. The operations of 1620 may be performed according to the methods described herein. In some examples, aspects of the operations of 1620 may be performed by a reference signal resource transmitting component as described with reference to FIGS. 10 through 13.

Figure 17:
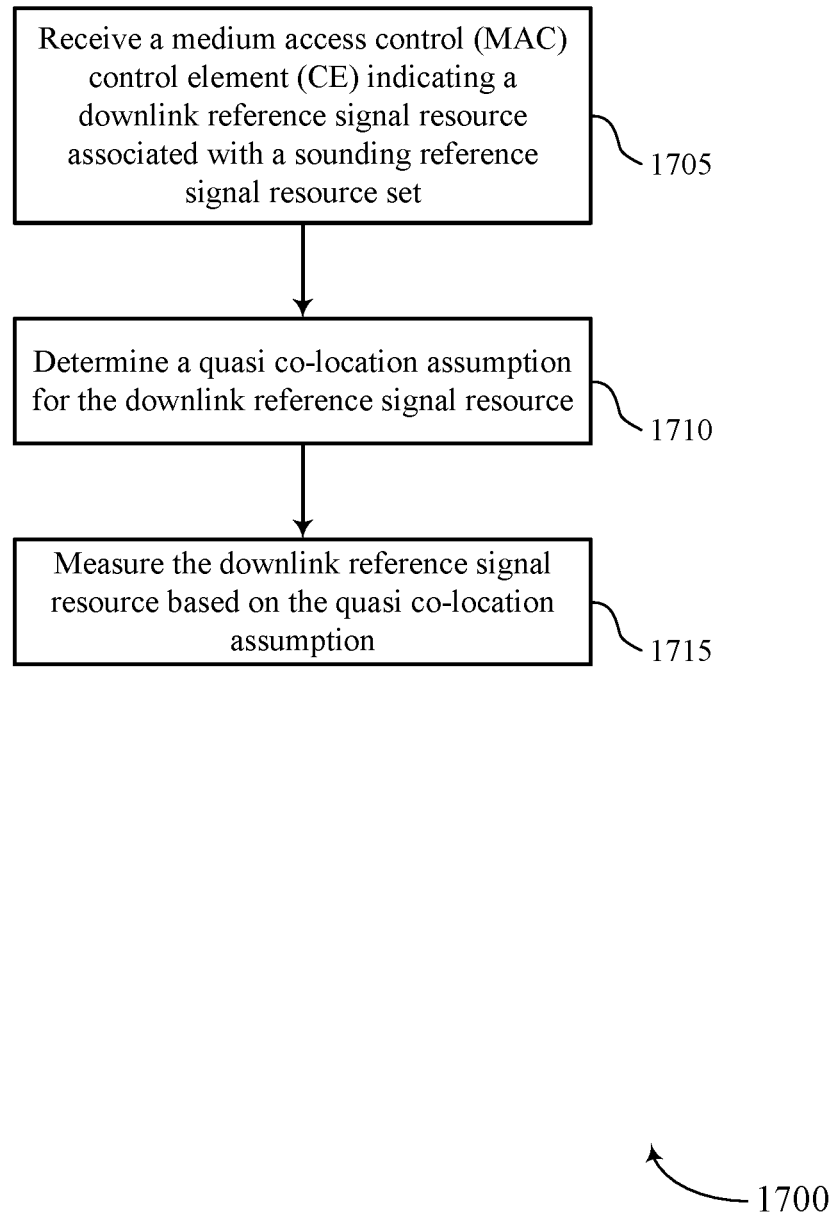

FIG. 17 shows a flowchart illustrating a method 1700 that supports beam switching techniques for uplink transmission in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive a medium access control (MAC) control element (CE) indicating a downlink reference signal resource associated with a sounding reference signal resource set. The operations of 1705 may be performed according to the methods described herein. In some examples, aspects of the operations of 1705 may be performed by a MAC CE receiving component as described with reference to FIGS. 6 through 9.

At 1710, the UE may determine a quasi co-location assumption for the downlink reference signal resource. The operations of 1710 may be performed according to the methods described herein. In some examples, aspects of the operations of 1710 may be performed by a QCL assumption determining component as described with reference to FIGS. 6 through 9.

At 1715, the UE may measure the downlink reference signal resource based on the quasi co-location assumption. The operations of 1715 may be performed according to the methods described herein. In some examples, aspects of the operations of 1715 may be performed by a measurement component as described with reference to FIGS. 6 through 9.

Figure 18:
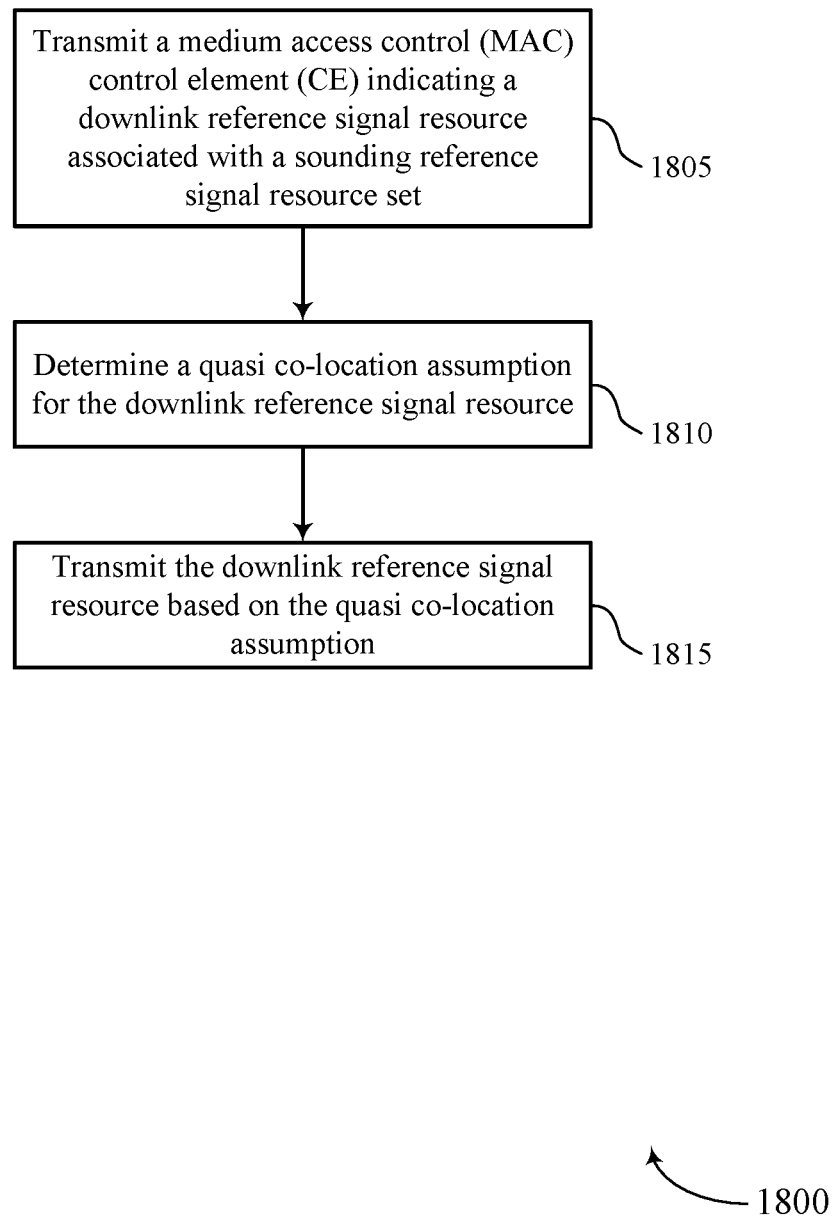

FIG. 18 shows a flowchart illustrating a method 1800 that supports beam switching techniques for uplink transmission in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit a medium access control (MAC) control element (CE) indicating a downlink reference signal resource associated with a sounding reference signal resource set. The operations of 1805 may be performed according to the methods described herein. In some examples, aspects of the operations of 1805 may be performed by a MAC CE transmitting component as described with reference to FIGS. 10 through 13.

At 1810, the base station may determine a quasi co-location assumption for the downlink reference signal resource. The operations of 1810 may be performed according to the methods described herein. In some examples, aspects of the operations of 1810 may be performed by a QCL assumption determining component as described with reference to FIGS. 10 through 13.

At 1815, the base station may transmit the downlink reference signal resource based on the quasi co-location assumption. The operations of 1815 may be performed according to the methods described herein. In some examples, aspects of the operations of 1815 may be performed by a reference signal resource transmitting component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource;
    receiving downlink control information in a first slot, the downlink control information indicating that the aperiodic sounding reference signal resource set is triggered;
    determining a quasi co-location assumption for the aperiodic downlink reference signal resource based at least in part on the slot offset associated with the aperiodic downlink reference signal resource;
    measuring the aperiodic downlink reference signal resource in a second slot indicated by the slot offset based at least in part on the quasi co-location assumption; and
    transmitting an aperiodic sounding reference signal on the aperiodic sounding reference signal resource set based at least in part on an uplink precoder that is determined for the aperiodic sounding reference signal resource set based at least in part on the measuring the aperiodic downlink reference signal resource in the second slot.

2. The method of claim 1, wherein determining the quasi co-location assumption further comprises:

determining a beam switching capability of the UE is smaller than a scheduling offset between the downlink control information and the aperiodic downlink reference signal resource; and identifying a transmit configuration indicator (TCI) state of the aperiodic downlink reference signal resource, wherein the quasi co-location assumption is associated with the TCI state of the aperiodic downlink reference signal resource based at least in part on the beam switching capability being smaller than the scheduling offset.

3. The method of claim 1, wherein determining the quasi co-location assumption further comprises:

determining a beam switching capability of the UE is greater than a scheduling offset between the downlink control information and the aperiodic downlink reference signal resource; and detecting a downlink signal scheduled to overlap with the aperiodic downlink reference signal resource, wherein the quasi co-location assumption is associated with the downlink signal based at least in part on the beam switching capability being greater than the scheduling offset.

4. The method of claim 1, wherein determining the quasi co-location assumption further comprises:

determining a beam switching capability of the UE is greater than a scheduling offset between the downlink control information and the aperiodic downlink reference signal resource; and identifying a default quasi co-location assumption, wherein the quasi co-location assumption is the default quasi co-location assumption based at least in part on the beam switching capability being greater than the scheduling offset.

5. The method of claim 4, wherein the default quasi co-location assumption is associated with a control resource set with a lowest control resource identifier among control resource sets monitored in a latest slot.

6. The method of claim 1, further comprising:

receiving a configuration for the aperiodic downlink reference signal resource comprising a transmit configuration indicator (TCI) state associated with the aperiodic downlink reference signal resource.

7. The method of claim 1, further comprising:

determining a scheduling offset for the aperiodic downlink reference signal resource based at least in part on the slot offset, wherein the scheduling offset corresponds to a number of symbol periods between a last symbol period of the downlink control information and a first symbol period of the aperiodic downlink reference signal resource.

8. The method of claim 1, further comprising:

identifying a set of configured transmit configuration indicator (TCI) states;

determining that all configured TCI states of the set of configured TCI states are not associated with a spatial quasi co-location assumption; and determining the slot offset to be zero, wherein the aperiodic downlink reference signal resource is in the first slot with the downlink control information.

9. The method of claim 1, wherein the downlink control information comprises group common downlink control information, uplink-based downlink control information, downlink-based downlink control information, or a combination thereof.

10. The method of claim 1, wherein the aperiodic downlink reference signal resource is triggered based at least in part on a sounding reference signal request field in the downlink control information.

11. The method of claim 1, wherein the aperiodic sounding reference signal resource set configuration information is received in a radio resource control configuration.

12. The method of claim 1, wherein the aperiodic downlink reference signal resource comprises an aperiodic channel state information reference signal resource.

13. A method for wireless communication at a network entity, comprising:

transmitting, to a user equipment (UE), sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource;

transmitting downlink control information in a first slot, the downlink control information indicating that the aperiodic sounding reference signal resource set is triggered;

determining a quasi co-location assumption for the aperiodic downlink reference signal resource based at least in part on the slot offset associated with the aperiodic downlink reference signal resource;

transmitting the aperiodic downlink reference signal resource in a second slot indicated by the first slot based at least in part on the quasi co-location assumption; and receiving an aperiodic sounding reference signal on the aperiodic sounding reference signal resource set based at least in part on the aperiodic downlink reference signal transmitted in the second slot.

14. The method of claim 13, wherein determining the quasi co-location assumption further comprises:

determining a beam switching capability of the UE is smaller than a scheduling offset between the downlink control information and the aperiodic downlink reference signal resource; and identifying a transmit configuration indicator (TCI) state of the aperiodic downlink reference signal resource, wherein the quasi co-location assumption is associated with the TCI state of the aperiodic downlink reference signal resource based at least in part on the beam switching capability of the UE being smaller than the scheduling offset.

15. The method of claim 13, wherein determining the quasi co-location assumption further comprises:

determining a beam switching capability of the UE is greater than a scheduling offset between the downlink control information and the aperiodic downlink reference signal resource; and identifying a downlink signal scheduled to overlap with the aperiodic downlink reference signal resource, wherein the quasi co-location assumption is associated with the downlink signal based at least in part on the beam switching capability of the UE being greater than the scheduling offset.

16. The method of claim 13, wherein determining the quasi co-location assumption further comprises:

determining a beam switching capability of the UE is greater than a scheduling offset between the downlink control information and the aperiodic downlink reference signal resource; and identifying a default quasi co-location assumption, wherein the quasi co-location assumption is the default quasi co-location assumption based at least in part on the beam switching capability of the UE being greater than the scheduling offset.

17. The method of claim 13, further comprising:
transmitting a configuration for the aperiodic downlink reference signal resource comprising a transmit configuration indicator (TCI) state associated with the aperiodic downlink reference signal resource.

18. The method of claim 13, further comprising:
determining a scheduling offset for the aperiodic downlink reference signal resource based at least in part on the slot offset, wherein the scheduling offset corresponds to a number of symbol periods between a last symbol period of the downlink control information and a first symbol period of the aperiodic downlink reference signal resource.

19. The method of claim 13, wherein the downlink control information comprises group common downlink control information, uplink-based downlink control information, downlink-based downlink control information, or a combination thereof.

20. The method of claim 13, further comprising:
triggering the aperiodic downlink reference signal resource based at least in part on a sounding reference signal request field in the downlink control information.

21. The method of claim 13, wherein the aperiodic sounding reference signal resource set configuration information is transmitted in a radio resource control configuration.

22. The method of claim 13, wherein the aperiodic downlink reference signal resource comprises a channel state information reference signal resource.

23. An apparatus for wireless communications at a user equipment (UE), comprising:
one or more memories storing processor-executable code; and
one or more processors coupled with the one or more memories and individually or collectively operable to execute the code to cause the UE to:
receive sounding reference signal resource set configuration information that indicates an aperiodic sounding reference signal resource set, an aperiodic downlink reference signal resource associated with the aperiodic sounding reference signal resource set, and a slot offset associated with the aperiodic downlink reference signal resource;
receive downlink control information in a first slot, the downlink control information indicating that the aperiodic sounding reference signal resource set is triggered;
determine a quasi co-location assumption for the aperiodic downlink reference signal resource based at least in part on the slot offset associated with the aperiodic downlink reference signal resource;
measure the aperiodic downlink reference signal resource in a second slot indicated by the slot offset based at least in part on the quasi co-location assumption; and
transmitting an aperiodic sounding reference signal on the aperiodic sounding reference signal resource set based at least in part on an uplink precoder that is determined for the aperiodic sounding reference signal resource set based at least in part on the measuring the aperiodic downlink reference signal resource in the second slot.

* * * * *